United States Patent
Kim et al.

(10) Patent No.: US 10,466,862 B2
(45) Date of Patent: Nov. 5, 2019

(54) INPUT DEVICE, ELECTRONIC APPARATUS FOR RECEIVING SIGNAL FROM INPUT DEVICE AND CONTROLLING METHOD THEREOF

(71) Applicant: Samsung Electronics Co., Ltd., Suwon-si, Gyeonggi-do (KR)

(72) Inventors: Kang-nam Kim, Seongnam-si (KR); Byung-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/146,269

(22) Filed: May 4, 2016

(65) Prior Publication Data

US 2016/0378217 A1 Dec. 29, 2016

Related U.S. Application Data

(60) Provisional application No. 62/185,162, filed on Jun. 26, 2015.

(30) Foreign Application Priority Data

Aug. 24, 2015 (KR) .................. 10-2015-0119068

(51) Int. Cl.
*G06F 3/041* (2006.01)
*G06F 3/0482* (2013.01)
(Continued)

(52) U.S. Cl.
CPC .......... *G06F 3/0482* (2013.01); *G06F 3/0362* (2013.01); *G06F 3/03545* (2013.01); *G06F 3/044* (2013.01); *G06F 3/04845* (2013.01); *G06F 3/04847* (2013.01); *G06F 3/04883* (2013.01)

(58) Field of Classification Search
CPC .......................... G06F 3/0482; G06F 3/04847
See application file for complete search history.

(56) References Cited

U.S. PATENT DOCUMENTS 5,633,471 A * 5/1997 Fukushima ............... G01L 1/20
178/19.04
8,803,850 B2 8/2014 Griffin et al.
(Continued)

FOREIGN PATENT DOCUMENTS

KR 10-2014-0100744 A 8/2014
WO 2013/165466 A1 11/2013

OTHER PUBLICATIONS

European Search Report dated Apr. 10, 2019, issued in European Patent Application No. 16 814 633.0.

*Primary Examiner* — Lixi C Simpson
(74) *Attorney, Agent, or Firm* — Jefferson IP Law, LLP

(57) ABSTRACT

An input device and an electronic apparatus are provided. The input device includes a case, a user manipulator disposed on the case, and a circuit configured to generate different signals according to a position change of the user manipulator. The user manipulator includes a movable member configured to be movable on the case, a first electrode fixed within the case, and a second electrode disposed on the movable member so as to be opposite to the first electrode in which an opposed area of the second electrode opposing the first electrode is varied according to the movement of the movable member.

8 Claims, 40 Drawing Sheets

(51) Int. Cl.
*G06F 3/044* (2006.01)
*G06F 3/0484* (2013.01)
*G06F 3/0488* (2013.01)
*G06F 3/0362* (2013.01)
*G06F 3/0354* (2013.01)

(56) References Cited

U.S. PATENT DOCUMENTS

| | | | |
|---|---|---|---|
| 2001/0006383 A1 | 7/2001 | Fleck et al. | |
| 2007/0188480 A1 | 8/2007 | Teng et al. | |
| 2007/0247446 A1* | 10/2007 | Orsley | G06F 3/0362 345/184 |
| 2008/0181353 A1* | 7/2008 | Ogata | G01D 5/2417 377/17 |
| 2014/0104224 A1 | 4/2014 | Ih et al. | |
| 2014/0218338 A1 | 8/2014 | Kim | |
| 2014/0253520 A1* | 9/2014 | Cueto | G06F 3/0383 345/179 |
| 2015/0123932 A1 | 5/2015 | Collins | |
| 2016/0056003 A1* | 2/2016 | Duerig | H01L 41/09 200/181 |
| 2016/0188017 A1* | 6/2016 | Bell | G06F 3/0346 345/179 |
| 2016/0266663 A1* | 9/2016 | Holsen | G06F 3/03545 |

* cited by examiner

PEN PRESSURE CHANGING

PEN PRESSURE MAINTAINING & USER MANIPULATOR MANIPULATING

ONLY PEN PRESSURE CHANGING

USER MANIPULATOR MANIPULATING

INPUT DEVICE, ELECTRONIC APPARATUS FOR RECEIVING SIGNAL FROM INPUT DEVICE AND CONTROLLING METHOD THEREOF

CROSS-REFERENCE TO RELATED APPLICATION(S)

This application claims the benefit under 35 U.S.C. § 119(e) of a U.S. Provisional application filed on Jun. 26, 2015 in the U.S. Patent and Trademark Office and assigned Ser. No. 62/185,162, and under 35 U.S.C. § 119(a) of a Korean patent application filed on Aug. 24, 2015 in the Korean Intellectual Property Office and assigned Serial number 10-2015-0119068, the entire disclosure of each of which is hereby incorporated by reference.

TECHNICAL FIELD

The present disclosure relates to devices, apparatuses, and methods consistent with what is disclosed herein. More particularly, the present disclosure relates to an input device, an electronic apparatus for receiving a signal inputted from the input device, and a controlling method thereof.

BACKGROUND

Strengthened with the development of electronic technology, various types of electronic apparatuses are developed and provided.

Specifically, provisioning of a smartphone or a tablet personal computer (PC) that can be carried around by a user has recently been actively discussed. The smartphone or the tablet PC mainly may include a touch screen, and a user can control functions of electronic apparatuses by using the touch screen.

A user may touch the touch screen by using an input device in the form of a pen as well as a body part (e.g., finger). The electronic apparatus may perform different control operations according to the touch coordinate where the body part or the input device touches the touch screen and the menu (or icon) displayed on the touch coordinate.

However, according to related mechanisms, there is no distinguishable advantage of using the input device compared to the interaction performed by using user's body part. Thus, a new structure and mechanism are necessary, which allow a user to control more various functions when using an input device to input commands on the touch screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for an input device used in connection with an electronic apparatus.

Another aspect of the present disclosure is to provide an input device that can output various signals according to a user manipulation.

Another aspect of the present disclosure is to provide an electronic apparatus that can perform various control operations according to a signal received from the input device and a controlling method thereof.

In accordance with an aspect of the present disclosure, an input device is provided. The input device includes a case, a user manipulator disposed on the case, and a circuit configured to generate different signals according to a position change of the user manipulator. The user manipulator includes a movable member configured to be movable on the case, a first electrode fixed within the case, and a second electrode disposed on the movable member so as to be opposite to the first electrode in which an opposed area of the second electrode opposing the first electrode is varied according to the movement of the movable member.

The movable member may be disposed to be exposed externally from an interior of a hole in a linear shape formed in the case, and slid along the hole when force is applied on the movable member, and the user manipulator may further include an elastic member configured to return the movable member back to an initial position when the force applied on the movable member is lifted off while the movable member is moved within the hole.

The first electrode may include a pair of first electrodes being disposed at a spacing on a printed circuit board inside the case, and the movable member may be disposed between the pair of first electrodes so that areas opposite to the initial position of the second electrode and the pair of first electrodes can respectively become zero.

The input device may further include a conductive tip disposed on one end of the case, and a pen pressure module configured to output different signals according to a pen pressure applied on the conductive tip.

In the above example, the first electrode may include a plurality of first electrodes divided and disposed at a spacing on the printed circuit board inside the case.

The user manipulator may further include a plurality of dielectric materials being formed respectively on the plurality of first electrodes and having different dielectric constants with respect to each other.

Alternatively, the plurality of first electrodes divided and disposed on the printed circuit board may not contact the second electrode when the movable member is at an initial position, and sequentially contact the second electrode when a position of the movable member is moved. The user manipulator may further include a plurality of capacitors respectively connected to the plurality of first electrodes, and the plurality of capacitors may each have a capacitance greater than a maximum capacitance of the pen pressure module.

The user manipulator may further include a dielectric material disposed between the first electrode and the second electrode.

An initial position of the movable member may be a position where opposed areas between the first electrode and the second electrode is maximized.

An initial position of the first electrode may be a position where the opposed area with the second electrode becomes minimized or zero.

In accordance with another aspect of the present disclosure, an input device is provided. The input device includes a user manipulator disposed on a case of the input device, and a circuit configured to generate different signals according to a manipulating state of the user manipulator. The user manipulator includes a movable member rotatably disposed on the case, a first electrode fixedly disposed within the case, a second electrode fixed on the movable member and rotated in association with the rotation of the movable member, and a dielectric material disposed between the first and the second electrodes. The user manipulator provides a variable capacitance to the circuit according to a rotating state of the second electrode.

The second electrode may be disposed in a shape in which an area changes gradually along an outer circumference of the movable member so that opposed areas between the first electrode and the second electrode is varied according to the rotation of the movable member.

The second electrode may be embedded inside the movable member and formed to be bent gradually toward a rotation axis of the movable member from a position adjacent to a surface of the movable member so that a distance between the first electrode and the second electrode is varied according to the rotation of the movable member.

In accordance with another aspect of the present disclosure, an electronic apparatus is provided. The electronic apparatus includes a touch panel, a signal processor configured to receive a signal generated from an input device movement including touching or approaching the touch panel through the touch panel, and detect a frequency of the signal, a storage configured to store information of a basic frequency, and a controller configured to perform a function corresponding to the movement of the input device on the touch panel. The controller differently adjusts implementing options of the function according to a difference value between the detected frequency and the basic frequency.

The controller may respectively compare the difference value between the detected frequency and the basic frequency with a plurality of preset critical values, and adjust the implementing options in stages according to a comparing result.

When a signal is received from the input device at the hovering state in which the input device approaches the touch panel, the controller may update the basic frequency stored in the storage based on the frequency detected from the received signal and newly store the same, and adjust the implementing options according to the updated basic frequency, and when a signal is received from the input device at the state in which the input device touches the touch panel, the controller may adjust the implementing options according to the difference value between the frequency detected from the received signal and the updated frequency.

When a signal is received from the input device at the hovering state in which the input device approaches the touch panel, the controller may calculate the difference value between the frequency detected from the received signal and the basic frequency stored in the storage, compare the difference value with a plurality of preset critical values, and adjust up or down the implementing options of the function in stages according to a comparing result, and when a signal is received from the input device at the state in which the input device touches the touch panel, the controller may adjust the implementing options of the function according to the difference value between the frequency detected from the received signal and the basic frequency stored in the storage.

When the input device is moved while touching or approaching the touch panel, the controller may implement displaying of writing trajectories on the touch panel according to the movement, and the controller may adjust at least one option among thickness, brightness, color, chroma, size, and shape of the writing trajectories according to the difference value between the detected frequency and the basic frequency.

When the frequency feature of the signal received from the input device is changed while the function displaying the content is performed on the touch panel, the controller may perform one operation among changing a content into another content, adjusting a display size of the content, scrolling the content, and changing a playback time of the content.

When a frequency characteristic of the signal received from the input device is changed, the controller may display a user interface (UI) including a plurality of menus on the touch panel, and sequentially change an item to be selected on a plurality of menus according to changes made.

According to the above various embodiments of the present disclosure, a user can control the electronic apparatus more conveniently and efficiently by using the input device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
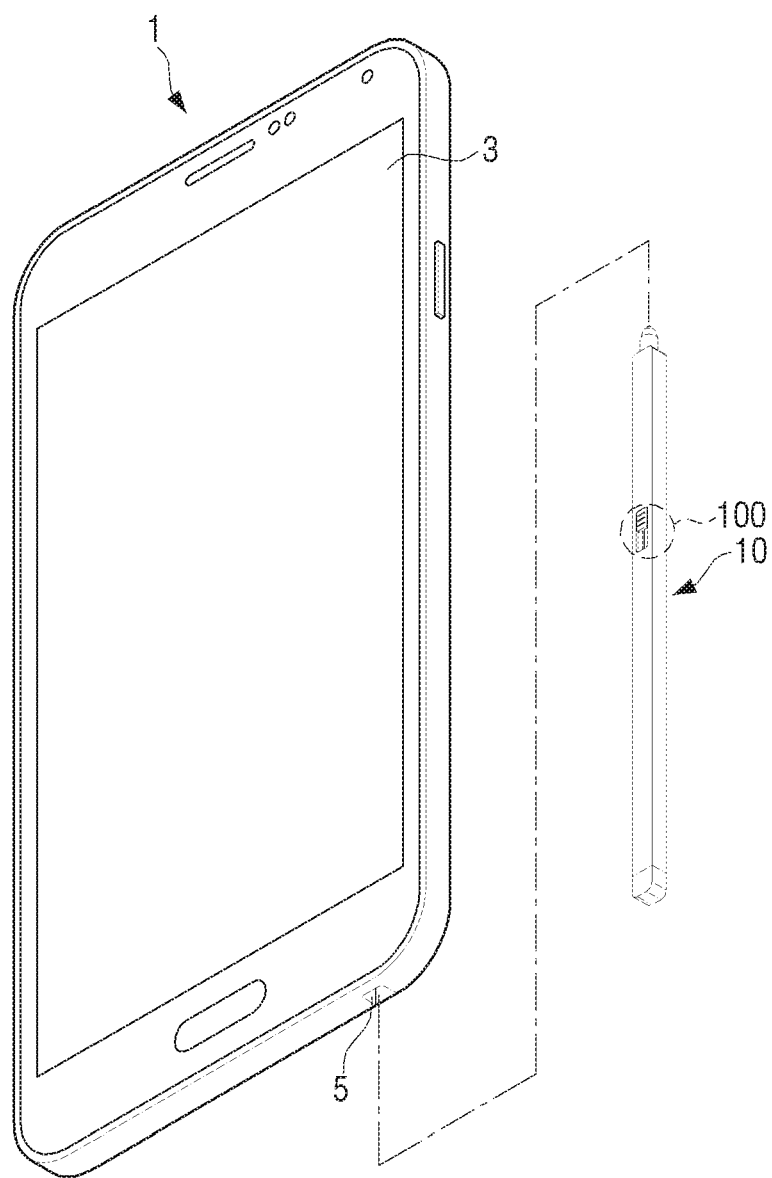
FIG. 1 is a perspective view illustrating an electronic apparatus and an input device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, expressions such as "first", "second", and so on as used herein may modify a variety of elements irrespective of order and/or importance thereof, and these are used only to distinguish one element from another and do not limit the corresponding elements. For example, a first user device and a second user device may refer to different user devices, irrespective of order or importance thereof. For example, without departing from the scope as described herein, a first element may be referred to as a second element, or similarly, a second element may be referred to as a first element.

When a certain element (e.g., first element) is stated as being "(operatively or communicatively) coupled with/to" or "connected to" another element (e.g., second element), this should be understood as meaning that the certain element can be coupled with/to another element directly or via yet another element (e.g., third element). In contrast, when a certain element (e.g., first element) is stated as being "directly coupled with/to" or "directly connected to" another element (e.g., second element), it can be understood that there is no other element present between the certain element and another element.

The terms used herein are provided only to describe specific embodiments of the present disclosure, and may not limit the scope of other embodiments. Unless otherwise defined specifically, a singular expression may encompass a plural expression. The terms used herein, including both technical and scientific terms, may have the same meanings as are generally understood by those with ordinary knowledge in the technical field described herein. Among the terms used herein, those that are defined in the dictionaries may be interpreted based on the same or similar definitions that can be understood in the associated technical context, and unless specifically defined otherwise, these are not interpreted as ideal or unnecessarily formal ways. Depending on cases, even the terms defined herein cannot be interpreted as closing to the various embodiments of the present disclosure described herein.

Referring to the attached drawings, various embodiments of the present disclosure will be described in detail below.

FIG. 1 is a perspective view illustrating an input device 10 and an electronic apparatus 1 according to an embodiment of the present disclosure.

Referring to FIG. 1, the input device 10 according to an embodiment may be implemented as having a long and slender pen shape of a predetermined length to allow an easy grip by a user. While the input device 10 may be referred to as any one of "an electronic pen," "a pen-type input device," "a stylus pen," "an S-pen," and the like, the input device may not be necessarily implemented to have a pen shape. For example, the input device may be implemented to have a body in a stubby or flat shape. The input device will be referred to below as an input device 10, for convenience of explanation.

Further, although FIG. 1 illustrates that the electronic apparatus 1 is implemented as a smartphone, various embodiments of the present disclosure are not limited thereto. For example, the electronic apparatus 1 may be implemented as a foldable portable phone or a slide type portable phone. Further, the electronic apparatus 1 may be implemented in various types of devices such as a tablet PC, laptop PC, monitor PC, television (TV), kiosk, Moving Picture Experts Group phase 1 or phase 2 (MPEG-1 or MPEG-2), Moving Picture Experts Group audio layer III (MP3) player, electronic frame, and so on.

Referring to FIG. 1, the input device 10 may be removably inserted into an inserting hole 5 of the electronic apparatus 1. The length of the input device 10 may be properly set by considering the size (area, length, and depth) of the electronic apparatus 1.

A user may insert and keep the input device 10 in the inserting hole 5 of the electronic apparatus 1 when not in use, and separate the input device 10 from the inserting hole 5 for use when necessary. The input device 10 may be provided with a user manipulator 100 that can be manipulated by a user. The user manipulator 100 may be formed at a position so that a user pushes or rotates the input device 10 with their fingers while gripping it in their hand. Specific shapes and operations of the user manipulator 100 will be described below in detail.

A user may control the operation of the electronic apparatus 1 by gripping the input device 10, and touching or approaching a display 3 of the electronic apparatus 1. The action of touching the display 3 will be referred to herein as a "touch gesture" and the action of approaching the display 3 within a certain distance will be referred to as a "hovering gesture."

When a user manipulates the user manipulator 100 of the input device 10 while performing the touch or the hovering gesture, the input device 10 may output different signals depending on manipulating states thereof.

The electronic apparatus 1 may perform different controlling according to the signals outputted from the input device 10. For example, when a user touches the display 3 with the input device 10 and moves the point of touch, the electronic apparatus 1 may display a line according to the trajectory of the movement. Such a line will be referred to herein as a "writing trajectory." When a user manipulates the user manipulator 100 in the above state, the electronic apparatus 1 may adjust the depth, brightness, size, color, chroma, font, shape, and so on of the writing trajectories according to the direction or degree of the manipulation. Further, the electronic apparatus 1 may change the function of the input device 10 to a line drawing function, an erasing function, and a cutting function according to the manipulating state.

Figure 2:
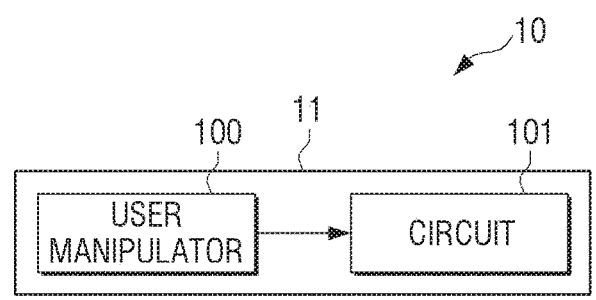
FIG. 2 is a block diagram illustrating constitution of an input device according to an embodiment of the present disclosure.

FIG. 2 is a block diagram illustrating a constitution of the input device according to an embodiment of the present disclosure. Referring to FIG. 2, the input device 10 includes a case 11, a user manipulator 100, and a circuit 101. The input device 10 may be implemented with various methods such as electronic current resonance (ECR) method, electro magnetic resonance (EMR) method, active method, and so on.

Referring to FIG. 2, when implemented with the ECR method, the input device 10 may include a conductive tip 20 (see FIG. 3) disposed on one end of the case 11. When implemented with EMR method, the input device 10 may include a coil for inducing electricity with an external electromagnetic signal. In the active method, the input device 10 may further include a battery.

An embodiment will be described below with reference to the input device 10 operating with ECR method.

The case 11 refers to a main body forming an exterior shape of the input device 10. The case 11 may be integrally formed, or alternatively, formed as several parts to be assembled with each other.

The user manipulator 100 can be directly manipulated by a user. The user manipulator 100 may be configured to be movable on the case 11.

The circuit 101 may generate different signals according to position change of the user manipulator 100. In an example of the input device 10 implemented with ECR method, the circuit 101 may receive electromagnetic signals through the conductive tip 20 (see FIG. 3) formed on one end of the case. The circuit 101 may include a resonance circuit including an inductor and a capacitor connected to the conductive tip. The resonance circuit within the circuit 101 may generate an electromagnetic signal by resonating with the electromagnetic signal induced through the conductive tip 20. The resonance frequency of the electromagnetic signal generated by the circuit 101 may vary depending on the state of the user manipulator 100.

The user manipulator 100 includes a movable member configured to be movable on the case, a first electrode fixed within the case, and a second electrode arranged on the movable member opposite to the first electrode in which the opposed area of the second electrode opposing the first electrode is varied according to the movement of the movable member. The first and the second electrodes may operate as capacitors. A separate dielectric material may be provided between the first and the second electrodes. Alternatively, the first and the second electrodes may be displaced by a certain distance without having a dielectric material. Accordingly, when a user moves the movable member, a capacitance value varies as the opposed areas between the first and the second electrodes change.

As a result, the user manipulator 100 may provide different sizes of capacitance to the circuit 101 depending on the manipulating state. Thus, because the capacitor value of the resonance circuit within the circuit 101 is changed, the resonance frequency of the electromagnetic signal generated in the circuit 101 may be changed. The operation of the input device 10 with ECR method and the operation of the electronic apparatus 1 will be specifically described below.

The movable member of the user manipulator 100 may be implemented in various types including a slide button which changes position by sliding on the case 11, a wheel button type which rotates on the case 11, a press button type which is pushed inward to the case 11 via a user, and so on.

Figure 3:
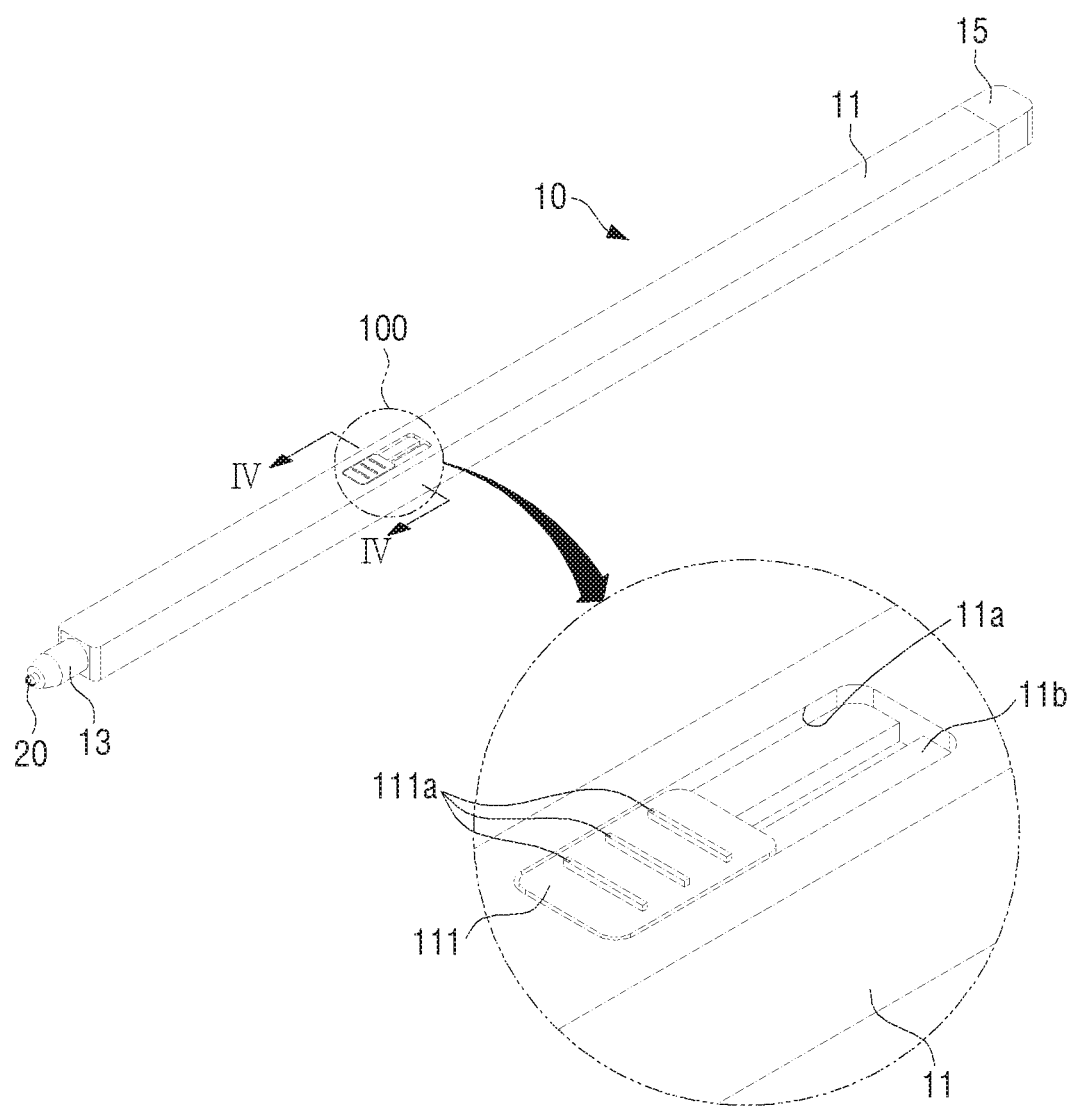
FIG. 3 is a perspective view illustrating an exterior shape of an input device according to an embodiment of the present disclosure.

FIG. 3 is a diagram illustrating the constitution of the user manipulator of the input device according to an embodiment of the present disclosure. Because FIG. 3 illustrates the input device with ECR method as an example, the conductive tip 20 may be included. However, when implemented with the other methods as described above, the conductive tip 20 may be omitted.

Referring to FIG. 3, the input device 10 may include the case 11 that can be gripped by a user, the conductive tip 20, a tip supporter 13 supporting the conductive tip 20 on the front end of the case 11, a cap 15 coupled with the rear end of the case 11, and the user manipulator 100.

The conductive tip 20 may be formed to be a metal tip, for example. The conductive tip 20 may be implemented in a form in which the tip is arranged within non-conductive material or in which the part of the conductive tip 20 is exposed externally. Further, in order to ensure a smooth writing feeling of the conductive tip 20 when in use, the conductive tip 20 may further include an insulating material to prevent direct contact with the display.

The case 11 may be formed from a conductive material, and grounded with a ground component of a printed circuit board arranged inside the case 11 through the electrical wire. Although FIG. 3 illustrates the case 11 in a square pillar shape, various embodiments of the present disclosure are not limited thereto. For example, the case 11 may be implemented in various shapes such as cylinder or hexagonal pillar.

The case 11 may be provided with a hole 11a through which a knob 111 of a movable member 110 is exposed. A protrusion 111a may be formed on the knob 111 in order to prevent sliding. However, the protrusion may be omitted depending on various embodiments of the present disclosure. The hole 11a may be formed in the length direction of the case 11 so that the knob 111 can be moved. Although FIG. 3 illustrates that the hole 11a is formed in a rectangle shape so that the knob 111 is moved in a straight line direction, the shape of the hole 11a may be changed variously. For example, the sectioned side of the hole 11a may be designed to a curved or sine-wave shape so that the knob 111 is moved in the curved or sine-wave shape. The term "hole 11a" may be referred to herein as a "groove" or a "sliding hole."

Inside the hole 11a, a guide rib 11b to slidably guide the movable member 110 in the straight line direction, may be formed. When a user grips the knob 111 of the movable member 110 and pushes it toward one or another direction, the knob 111 of the movable member 110 may be moved along the hole 11a of the guide rib 11b.

Figure 4:
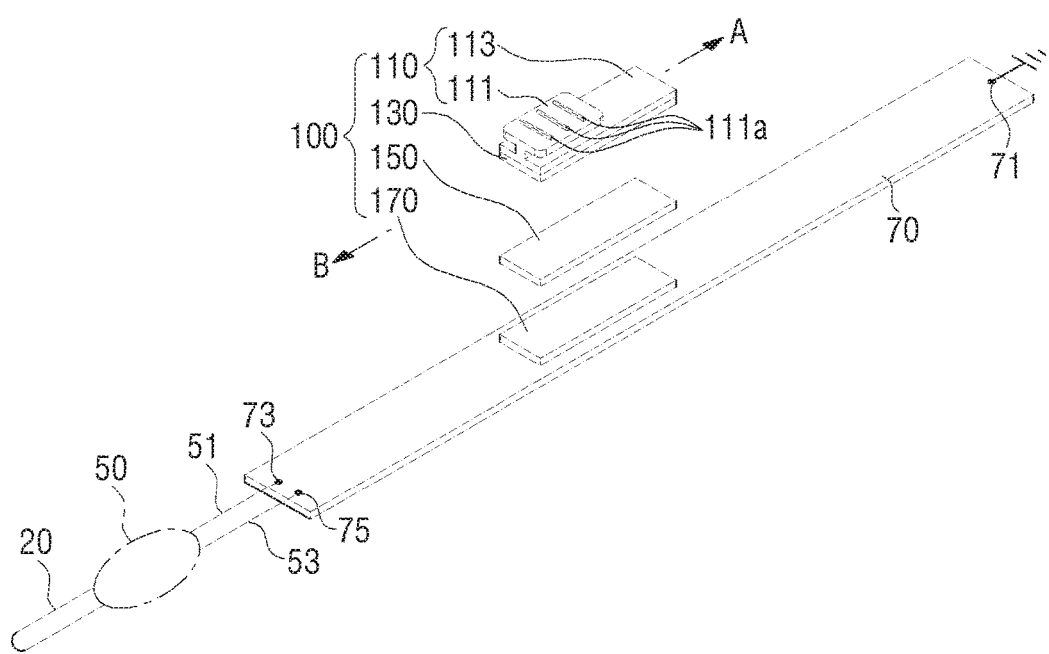
FIG. 4 is a schematic perspective view exemplifying a detailed constitution of an input device according to an embodiment of the present disclosure.

FIG. 4 illustrates an example of the internal constitution of the input device according to an embodiment of the present disclosure. Referring to FIG. 4, the user manipulator 100 includes the movable member 100, a first electrode 170, a dielectric material 150, and a second electrode 130. The movable member 110 may include the knob 111 and a supporter 113 to support the knob 111. The knob 111 and the supporter 113 may be integrally formed. However, various embodiments of the present disclosure are not limited thereto, and accordingly, these may be formed as separate components to be assembled. The supporter 113 may be positioned inside the case 11, and the second electrode 130 may be attached on the bottom of the supporter 113. Thereby, the second electrode 130 may be formed as conductive metal substance of a thin plate shape. When the movable member 110 is moved while the second electrode 130 is fixed on the bottom of the supporter 113, the position of the second electrode 130 may be changed in association with the above movement.

Referring to FIG. 4, the first electrode 170 of the user manipulator 100 may be fixed on the printed circuit board 70. The first electrode 170 may include a thin metal pad. The first electrode 170 may be arranged opposite to the second electrode 130. The width and the length of the first electrode 170 may be formed uniformly or differently to or from the width and the length of the second electrode 130.

As described above, because the second electrode 130 may be moved together in association with the movement of the movable member 110, the opposed areas between the second electrode 130 and the first electrode 170 may increase or decrease according to the moving direction of the movable member 110.

The dielectric material 150 may be arranged between the first electrode 170 and the second electrode 130. Specifically, the dielectric material 150 may be fixed and formed on one of the first electrode 170 and the second electrode 130. Further, the different two dielectric materials may be respectively formed on the first electrode 170 and the second electrode 130. The changed range of the capacitance value provided by the user manipulator 100 may change according to the size or the depth of the dielectric constant (a) of the dielectric material 150. The dielectric material 150 may include the dielectric film or the non-conductive material having a certain dielectric constant (e.g., synthetic resin such as polycarbonate or polyacetal), although various embodiments of the present disclosure are not limited thereto.

A ground component 71 may be formed on one side of the printed circuit board 70. The case 11 may be grounded on the ground component 71 of the printed circuit board 70 within the case 11.

As described above, a user may change the capacitance of the circuit 101 by manipulating the user manipulator 100. FIG. 4 illustrates an example in which a pen pressure module 50 is used together with the user manipulator 100.

The pen pressure module 50 may be respectively connected to the conductive tip 20 and the printed circuit board 70 within the case 11. The pen pressure module 50 may be electrically contacted to a positive (+) terminal 73 and a negative (−) terminal 75 of the printed circuit board 70 through a pair of electrical wires 51 and 53, respectively. The pen pressure module 50 may output the different electromagnetic signals according to the pen pressure applied on the conductive tip.

The pen pressure module 50 may include a resonance circuit connected to the conductive tip 20. The resonance circuit may include an inductor, a capacitor, and a changed capacitor. The changed capacitor may include the fixed electrode fixed within the case 11, the moving electrode moved according to the movement of the conductive tip 20, and the dielectric material arranged between the electrodes. Because the capacitance of the resonance circuit within the pen pressure module 50 is varied according to the movement of the moving electrode, the electromagnetic signal outputted from the pen pressure module 50 may be changed.

For example, a user may touch so that the conductive tip 20 is directed toward the display 3 of the electronic apparatus 1. According to the applied touching force, the pen pressure may change. The "pen pressure" refers to the force applied on the display 3 with the conductive tip 20. A user may press the display 3 strongly in the touching state, or may press the display 3 lightly. Because the conductive tip 20 may be moved toward contrary directions on the display 3 according to the amount of pen pressure, the capacitance size of the changed capacitor within the pen pressure module may be changed.

When using the input device 10 including both of the pen pressure module 50 and the user manipulator 100 as illustrated in FIG. 4, a user may control the operation of the electronic apparatus 1 variously by adjusting the applied touching force of the input device 10 on the electronic apparatus 1 or manipulating the user manipulator 100 separately.

Figure 5:
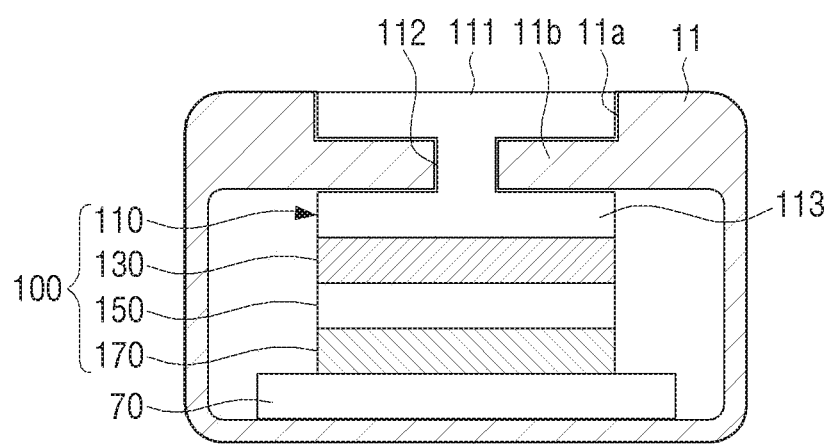
FIG. 5 is a cross sectional view taken on a line IV-IV in FIG. 3 according to an embodiment of the present disclosure.

FIG. 5 is a cross sectional view illustrating the user manipulator 100 along line IV-IV of FIG. 3 according to an embodiment of the present disclosure. Referring to FIG. 5, the movable member 110 may include a guide groove 112 formed between the knob 111 and the supporter 113. The guide rib 11*b* projected from the sided section of the hole 11*a* in the case 11 may be inserted into the guide groove 112. The guide rib 11*b* may be formed to be a pair of projected parts on both sides of the hole 11*a*. A pair of guide grooves 112 and a pair of guide ribs 11*b* may contact each other. Thus, when the movable member 110 is formed from a conductive material, the movable member 110 and the case 11 may be kept in the electrically connected state. As described above, when the case 11 is connected to the ground component 71 of the printed circuit board 70, the movable member 110 may be grounded.

Referring to FIG. 5, although FIGS. 3 and 4 illustrate and explain that the guide groove 112 and the guide rib 11*b* contact each other, a member to reduce the frictional force between the guide groove 112 and the guide rib 11*b* to thus allow smooth sliding, may be additionally provided. For example, a bearing (not shown) may be added between the guide groove 112 and the guide rib 11*b*, and a lubrication liquid or a lubrication coating material may be further included.

Further, FIGS. 3 and 4 explain a non-restoring method in which the movable member 110 may be kept on a set position without returning to the initial position when a user moves the movable member 110 to a desired set position. However, the movable member 110 may not be limited to the above. For example, the movable member 110 may be implemented with a restoring method in which the movable member 110 may return to the initial position when a user moves the movable member 110 to the desired position and lifts off the movable member 110. The restoring-type constitution of the user manipulator will be described below by referring to drawings.

Figure 6:
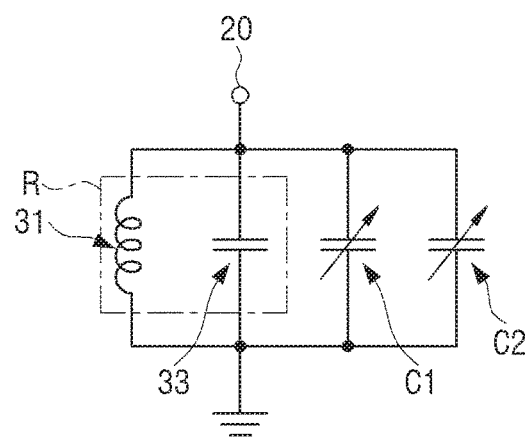
FIG. 6 is a circuit diagram modeling a function of a user manipulator of an input device is modeled according to an embodiment of the present disclosure.

FIG. 6 is a circuit diagram in which the operation of the circuit 101 of the input device including both of the pen pressure module 50 and the user manipulator 100 is modeled according to an embodiment of the present disclosure.

Referring to FIG. 6, the circuit 101 may include a resonance circuit R including an inductor 31 and a capacitor 33 connected in parallel. One end of the circuit 101 may be connected to the conductive tip 20, and the other end may be grounded. The circuit 101 may have a high-impedance feature at a specific resonance frequency.

The pen pressure module 50 and the user manipulator 100 may be connected to each other in the circuit 101. As described above, the pen pressure module 50 and the user manipulator 100 may respectively perform the role of the changed capacitors. As illustrated in FIG. 6, the circuit 101 may be modeled such that a first changed capacitor C1 and a second changed capacitor C2 are connected in parallel with the resonance circuit R.

The first changed capacitor C1 may have the capacitance which increases or decreases according to the changes in contact pressure of the conductive tip 20, i.e., the changes in the pen pressure. The second changed capacitor C2 may have the capacitance which increases or decreases according to the moving state of the user manipulator 100.

Thus, the input device 10 may output various electromagnetic signals according to the pen pressure or the user manipulating state.

Although FIGS. 4 and 6 explain the embodiment in which the pen pressure module 50 is used with the user manipulator 100, this is merely one of various embodiments of the present disclosure. The input device 10 may be implemented to include the user manipulator 100 only. In this case, the first changed capacitor C1 may be excluded from the circuit of FIG. 6.

Meanwhile, the initial position of the movable member of the user manipulator 100 may be variously changed according to the setting conditions. For example, the initial position of the movable member may be a point where the opposed areas between the first and the second electrodes becomes maximum or a point where the opposed areas becomes the minimum or zero.

Figure 7A:
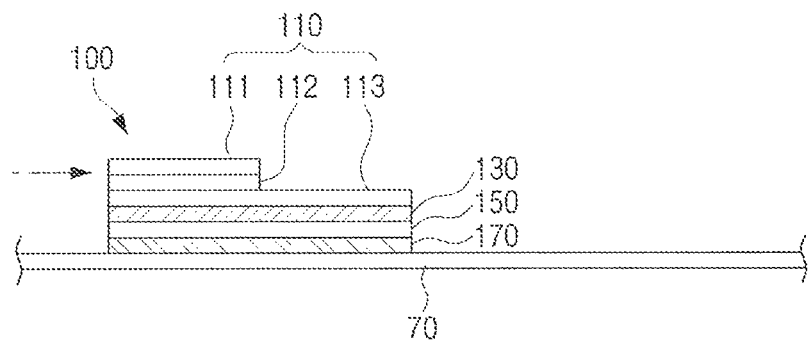
FIGS. 7A to 7C are diagrams provided to explain an example in which a movable member of a user manipulator is moved according to a user manipulation according to an embodiment of the present disclosure.
Figure 7B:
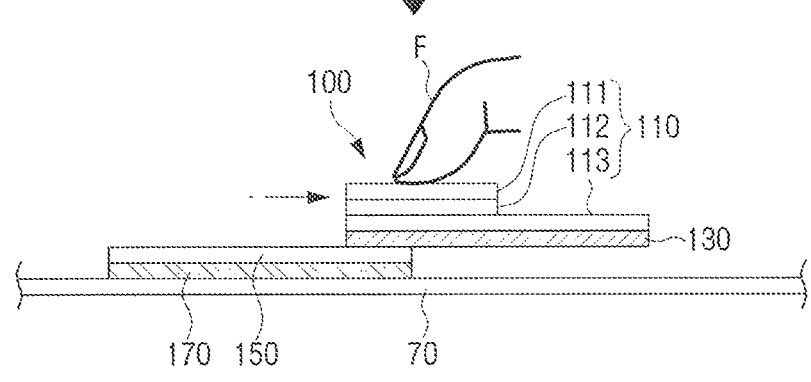
Figure 7C:
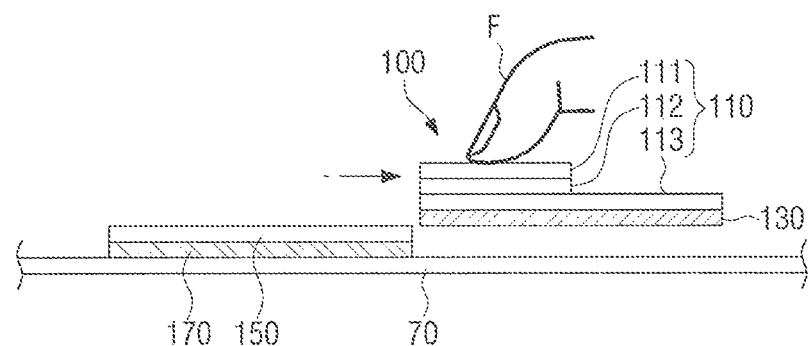

FIGS. 7A to 7C are diagrams illustrating an example in which the movable member of the user manipulator is moved according to a user manipulation according to an embodiment of the present disclosure. FIGS. 7A to 7C illustrate that the initial position of the movable member is set to be a point where the opposed areas between the first and the second electrodes is maximized.

Referring to FIGS. 7A to 7C, for the opposed areas to be maximized, the initial position of the movable member 110 may be set to a point where the second electrode 130 is fully overlapped with the first electrode 170.

In the above state, referring to FIG. 7B, when a user moves the movable member 110 of the user manipulator 100 toward a first direction (e.g., to the back of the case or to right-hand direction of FIGS. 7A to 7C) with his or her fingers, the second electrode 130 may be moved. While the second electrode 130 is moved toward the first direction, the area to be co-operated with the first electrode 170 may decrease. Thereby, the capacitance provided by the user manipulator 100 may gradually decrease.

Referring to FIG. 7C, when the movable member 110 is slid and moved until the opposed areas between the second electrode 130 and the first electrode 170 becomes zero, the capacitance of the user manipulator 100 may have the minimum value which is zero or close to zero.

Thus, the capacitance may gradually decrease during movement from the initial position where the opposed areas between the second electrode 130 and the first electrode 170 is maximum, to the position in which the opposed areas becomes zero.

On the contrary, when the movable member 110 is sequentially moved toward a second direction (e.g., to the front direction of the case or left-hand direction of FIGS. 7A to 7C), the capacitance may gradually increase during movement from the position in which the opposed areas between the second electrode 130 and the first electrode 170 is zero to the initial position in which the opposed areas is maximized. Thus, the capacitance provided to the circuit 101 may decrease or increase as a user slides and moves the movable member 110 of the user manipulator 100 toward the first direction or the second direction.

Figure 8A:
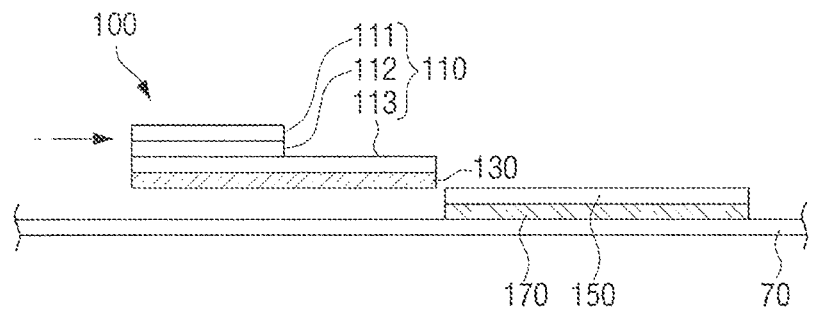
FIGS. 8A to 8C are diagrams illustrating another example in which a movable member of a user manipulator is moved according to a user manipulation according to an embodiment of the present disclosure.
Figure 8B:
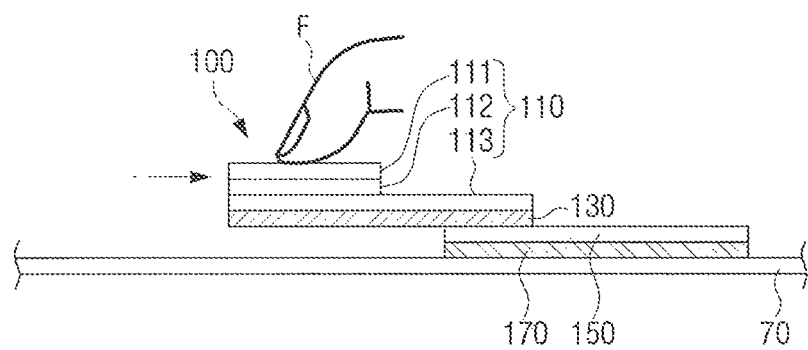
Figure 8C:
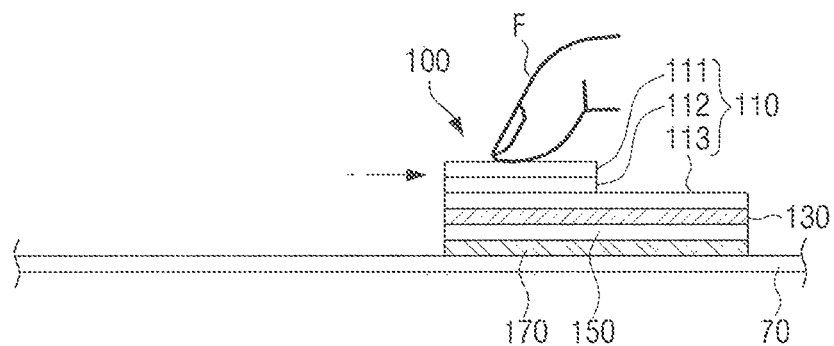

FIGS. 8A to 8C are diagrams illustrating an example in which the movable member of the user manipulator is moved according to a user manipulation from the initial position different from FIGS. 7A to 7C according to an embodiment of the present disclosure.

Referring to FIGS. 8A to 8C, the user manipulator 100 may be configured uniformly as the user manipulator 100 of FIGS. 7A to 7C, but the initial position of the second electrode 130 may be different. Thus, the initial position of the second electrode 130 may be set to be position where the opposed areas with the second electrode 130 and the first electrode 170 is zero, as illustrated in FIG. 8A. On the above initial position, the capacitance provided by the user manipulator 100 may become zero or the value closest to zero.

When the movable member 110 is slid and moved toward the first direction on the initial position, the opposed areas by the second electrode 130 and the first electrode 170 may gradually increase as illustrated in FIG. 8B. Thereby, the capacitance may also gradually increase. When the second electrode 130 is fully overlapped with the first electrode 170, as illustrated in FIG. 8C, the capacitance may be maximized.

When the movable member 110 is slid and moved toward the initial position direction, i.e., the second direction in the above state, the opposed areas by the second electrode 130 and the first electrode 170 may gradually decrease, and thus, the capacitance may also gradually decrease.

Thereby, the initial position of the first electrode may be set on various positions.

According to the above embodiments of the present disclosure, there may be one first electrode and one second electrode provided. However, according to another embodiment of the present disclosure, at least one of the first and the second electrodes may be provided as plural electrodes.

Figure 9:
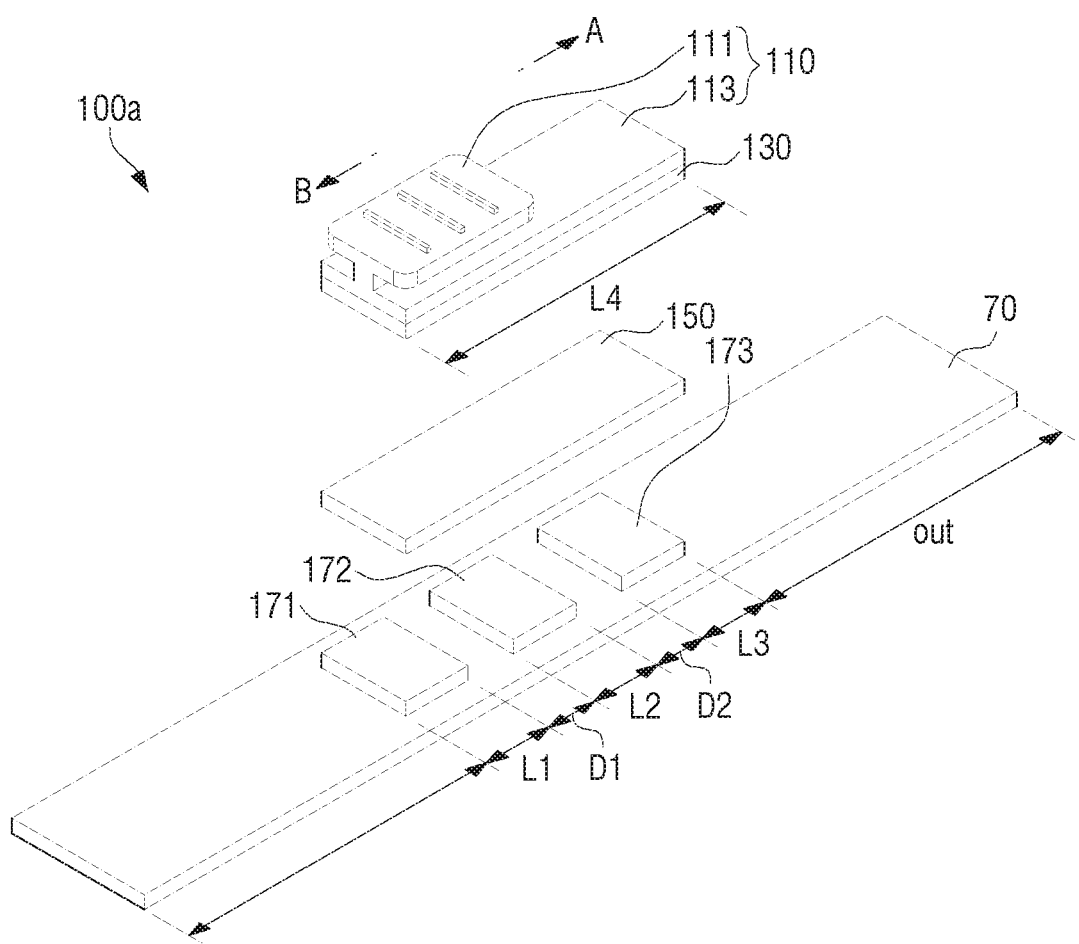
FIG. 9 is a perspective view illustrating internal constitution of a user manipulator of an input device according to another embodiment of the present disclosure.

FIG. 9 illustrates an example in which a plurality of first electrodes of the user manipulator are provided according to an embodiment of the present disclosure.

Referring to FIG. 9, a user manipulator 100a may be configured uniformly to the user manipulator 100 described above, however, there is a difference in that a plurality of first electrodes 171, 172, 173 are provided. Thus, the same drawing reference numerals of the user manipulator 100 are used to refer to the same or like elements of the user manipulator 100a, which will not be further explained below for the sake of brevity.

Referring to FIG. 9, the user manipulator 100a may include the plurality of first electrodes 171, 172, 173 arranged in the length direction of the printed circuit board 70 by having the intervals D1, D2. Each of the first electrodes 171, 172, 173 may have certain lengths L1, L2, L3. In this case, the plurality of first electrodes 171, 172, 173 may have uniform or different intervals D1, D2. Further, the plurality of first electrodes 171, 172, 173 may have uniform or different lengths L1, L2, L3.

Further, the length L4 of the second electrode 130 may be formed to be uniform or greater than a length in which the lengths L1, L2, L3 and the intervals D1, D2 are added regarding the plurality of first electrodes 171, 172, 173. The length of the dielectric material 150 arranged between the second electrode 130 and the plurality of first electrodes 171, 172, 173 may be formed to be uniform to the length of the second electrode 130.

When the plurality of first electrodes 171, 172, 173 are provided as illustrated in FIG. 9, the plurality of first electrodes 171, 172, 173 may be sequentially opposite to the second electrode 130 when a user pushes the movable member 110 toward one direction. For example, when the initial position of the movable member 110 is an external area (i.e., out area) of a third first electrode 173, the second electrode 130 may be gradually opposite to the third first electrode 173 while the movable member is moved in the B direction. When the movable member 110 is continued to be moved, the third first electrode 173 may be fully opposite to the second electrode 130, and a second first electrode 172 may be gradually opposite to the second electrode 130. When the movable member 110 is moved fully toward B direction, each of the plurality of first electrodes 171, 172, 173 may be opposite to the second electrode 130 as illustrated in FIG. 9. At this process, the maximum capacitance may be provided.

Figure 10:
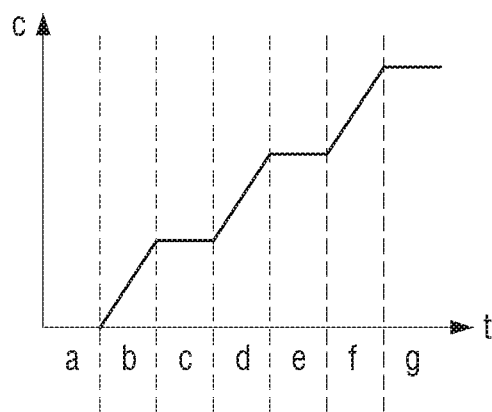
FIG. 10 is a graph provided to explain capacitance change characteristic according to the embodiment of FIG. 9 of the present disclosure.

FIG. 10 is a graph illustrating a capacitance change process according to the embodiment of FIG. 9 according to an embodiment of the present disclosure. FIG. 10 illustrates an example in which the initial position of the movable member 110 is at the out area which is an external side of the third first electrode 173, and a user pushes the movable member 110 in the B direction.

Referring to FIG. 10, the capacitance may be kept to become zero or the minimum value without changes while the movable member 110 is moved on the out area (i.e., a section of FIG. 10). In this state, when the movable member 110 is continued to be moved after passing through the arranged position of the third first electrode 173, the opposed areas may gradually increase. Thus, the capacitance may increase proportionally to the movement (b section of FIG. 10). The capacitance may be kept while the movable member 110 is fully overlapped by the third first electrode 173 and is not overlapped by the second first electrode 172 (c section of FIG. 10). When the movable member 110 is continued to be moved, the sections (b, d, and f sections) in which the capacitance gradually increases may appear by stages, as illustrated in FIG. 10. Because the first electrode is divided into three units in FIG. 9, the gradual increasing section of the capacitance may also appear in three sections. The inclination of the capacitance changes in each section may be measured differently according to the size or the depth of the plurality of first electrodes 171, 172, 173.

Although FIG. 9 illustrates and explains an example in which the dielectric material 150 is fixed on the second electrode 130, the dielectric material 150 may be provided respectively on the plurality of first electrodes 171, 172, 173. In this case, the dielectric constant of the dielectric material on the plurality of first electrodes 171, 172, 173 may be set to be different from each other. The inclinations of the capacitance increasing sections in FIG. 10 may be different to each other.

Figure 11:
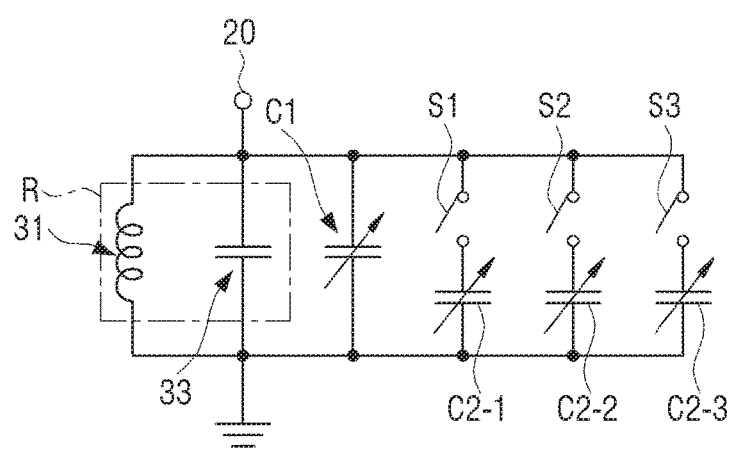
FIG. 11 is a diagram illustrating the circuit in which the function of the user manipulator of FIG. 9 is modeled according to an embodiment of the present disclosure.

FIG. 11 is a circuit diagram in which the operation of the user manipulator is modeled. Referring to FIG. 11, when the user manipulator 100a includes the plurality of first electrodes 171, 172, 173, the user manipulator may be modeled to be a plurality of paths including switches S1, S2, S3 and second changed capacitors C2-1, C2-2, C2-3.

As described above, when the initial position of the movable member 110 is at an external side of the third first electrode 173 positioned on the most right side among the plurality of first electrodes 171, 172, 173 and when the movable member 110 is moved in the B direction, the switch S3 may be first turned on. The size of the capacitance C2-3 may gradually increase while the switch S3 is turned on. When the movable member 110 is continued to be moved in the B direction, the switch S2 and the switch S3 may be sequentially turned on.

Because FIG. 11 models an example in which the pen pressure module 50 is included, the first changed capacitor C1 provided by the pen pressure module 50 may be also added.

In this case, each of the second changed capacitors values C2-1, C2-2, C2-3 may be set to be changed within a greater value range than the first changed capacitor C1 in order to distinguish whether the changes occur in the first changed capacitor C1 or the second changed capacitors C2-1, C2-2, and C2-3. For example, the dielectric material 150 may be produced with material having a greater dielectric constant than the dielectric material within the pen pressure module 50, or the changed width may increase by expanding the size of the dielectric material 150 or reducing the depth of the dielectric material 150 to be thinner. Thereby, the above distinguishing may be performed because the frequency change according to the manipulation of the user manipulator 100 becomes greater than the frequency changes according to the pen pressure module 50.

Although FIG. 9 explains that the user manipulator 100a includes three first electrodes 171, 172, 173, various embodiments of the present disclosure are not limited thereto. For example, two or more than four electrodes may be configured. In this case, the length of the second electrode 130 and the length of the dielectric material 150 may be formed by considering a number of the second electrodes and the distances between the second electrodes.

Further, although FIG. 9 illustrates that the size of the second electrode 130 is uniform or greater than the added lengths of the plurality of first electrodes 171, 172, 173, various embodiments of the present disclosure are not limited thereto. For example, the second electrode 130 may be manufactured to be similar size to each of the plurality of first electrodes 171, 172, 173. Thereby, when passing through a first electrode 171, only the first electrode 171 may be overlapped, and the second first electrode 172 and the third first electrode 173 may not be overlapped.

Thereby, the signals having various frequency features may be outputted by changing the position, shape, and number of the electrodes variously.

Although FIG. 9 explains that the dielectric material is used within the user manipulator, the dielectric material may be excluded according to another embodiment.

Figure 12:
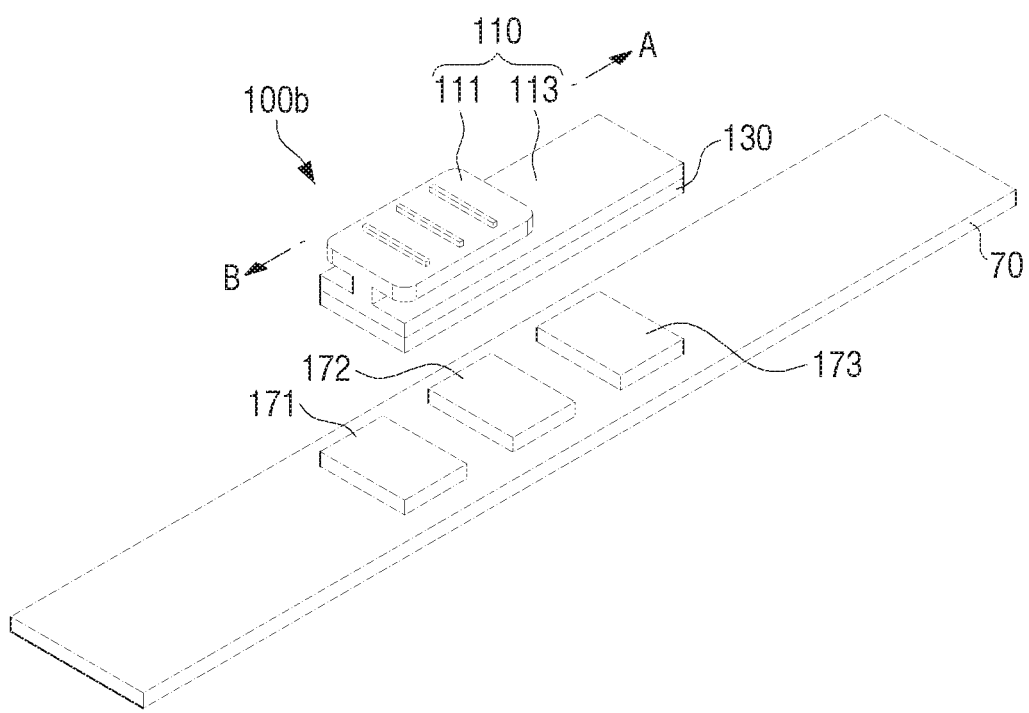
FIG. 12 is a perspective view illustrating the internal constitution of the user manipulator of the input device according to another embodiment of the present disclosure.

FIG. 12 is a diagram illustrating an example in which a plurality of first electrodes are configured in the user manipulator and the dielectric material is excluded according to an embodiment of the present disclosure.

Referring to FIG. 12, a user manipulator 100b of FIG. 12 may be configured uniformly to the user manipulator 100a described above. However, the user manipulator 100b of FIG. 12 may exclude the dielectric material 150, and a plurality of first electrodes 171, 172, 173 may be respectively and electrically connected to a plurality of capacitors C2-11, C2-22, C2-33 mounted on the printed circuit board 70. Thereby, when a plurality of first electrodes 171, 172, 173 contact the second electrode 130, the switch role (on/off operation) may be performed.

Referring to FIG. 12, when assuming that the initial position of the movable member is an external side of the first electrode 171 and the movable member 110 is slid and moved in the A direction, the second electrode 130 may sequentially contact to the plurality of first electrodes 171, 172, 173. In this case, because the first electrode and the second electrode directly contact each other, they may operate as a switch. When the movable member 110 is continued to be moved in the A direction, first to third switches SW1, SW2, SW3 may be turned on sequentially as illustrated in FIG. 14.

Figure 13:
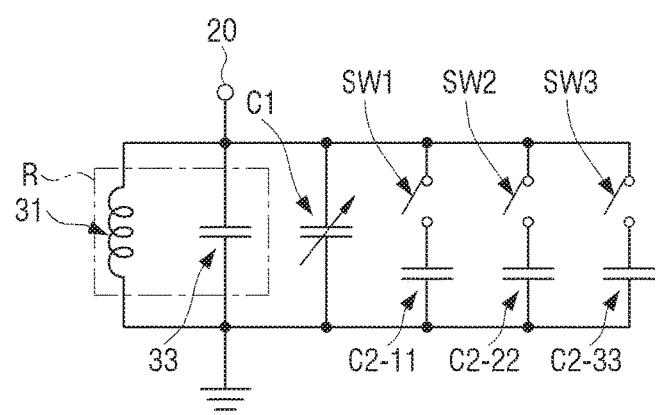
FIG. 13 is a diagram illustrating the circuit in which the function of the user manipulator in FIG. 12 is modeled according to an embodiment of the present disclosure.

FIG. 13 is a circuit diagram in which the user manipulator of FIG. 12 is modeled according to an embodiment of the present disclosure. Referring to FIG. 13, the circuit 101 may include a plurality of paths including the switches SW1, SW2, SW3 and the plurality of capacitors C2-11, C2-22, C2-33. Each switch may be sequentially turned on according to the movement of the movable member 110.

Figure 14:
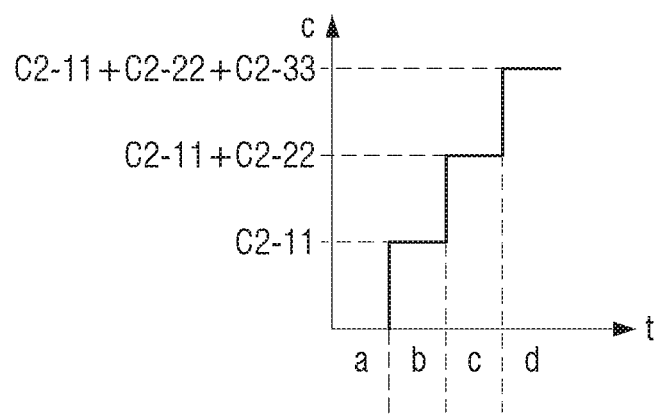
FIG. 14 is a graph provided to explain capacitance change characteristics according to the embodiment of FIG. 12 according to an embodiment of the present disclosure.

FIG. 14 is a graph illustrating the capacitance change according to the constitution of FIG. 12 according to an embodiment of the present disclosure.

Referring to FIG. 14, the capacitance provided by the user manipulator 100 may become zero or the minimum value closest to zero while the second electrode 130 is not overlapped with the first electrodes 171, 172, 173 (i.e., a section of FIG. 14). In the above state, when the first electrodes 171, 172, 173 are respectively overlapped with the second electrode 130 one by one, the capacitance may increase in stages (b, c, and d sections of FIG. 14). Differently from FIG. 10, the capacitance of FIG. 14 may be kept within each of b, c, and d sections without being gradually changed.

Meanwhile, the above explains that the movable member 110 of the user manipulator 100, 100a, 100b may be formed with the sliding button method based on the non-restoring method in which the position of the movable member 110 may be kept when a user moves the movable member 110 to a desired position.

However, as described above, the user manipulator may be implemented based on the restoring method as well as non-restoring method. The restoring method refers to a form in which the movable member 110 may return to the initial position after a user moves the movable member 110 to a desired position.

Following description will explain the constitution of the user manipulator implemented with the restoring method according to another embodiment of the present disclosure.

Figure 15:
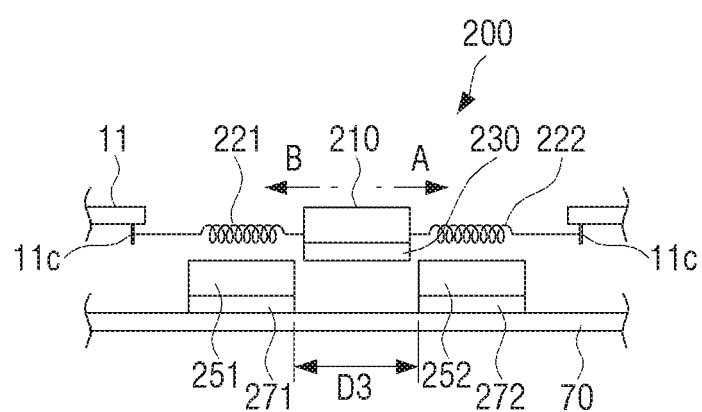
FIG. 15 is a diagram illustrating an internal constitution of a user manipulator of an input device according to another embodiment of the present disclosure.

FIG. 15 illustrates an example of the restoring type of the user manipulator in which the movable member of the user manipulator may return to the initial position due to an elastic member according to an embodiment of the present disclosure.

Referring to FIG. 15, the restoring type of a user manipulator 200 may include a movable member 210 and a second electrode 230 fixed and coupled with a bottom of the movable member 210 and moved with the movable member 210. The front end and the back end of the movable member 210 may be elastically fixed on the case 11 with first and second elastic members 221, 222 respectively.

For example, the first elastic member 221 may include the coil spring, one end may be fixed on the front end of the movable member 210, and the other end may be fixed on a protrusion 11c inside the case 11. Further, the second elastic member 222 may include the coil spring likewise in the first elastic member 221, one end may be fixed on the back end of the movable member 210, and the other end may be fixed on another protrusion 11c formed inside the case 11.

A pair of first electrodes 271, 272 may be arranged by having a certain interval D3 on the upper plane of the printed circuit board 70. The interval D3 between the pair of first electrodes 271, 272 may be set to be a distance in which the movable member 210 may be arranged between the pair of first electrodes 271, 272 simultaneously while not being overlapped with the pair of first electrodes 271, 272 when an external force is not applied to the movable member 210 (e.g., user force pushing or pulling the movable member 210).

A pair of dielectric materials 251, 252 having similar distances to the distances regarding the pair of first electrodes 271, 272 may be arranged on the upper surfaces of the pair of first electrodes 271, 272.

Figure 16:
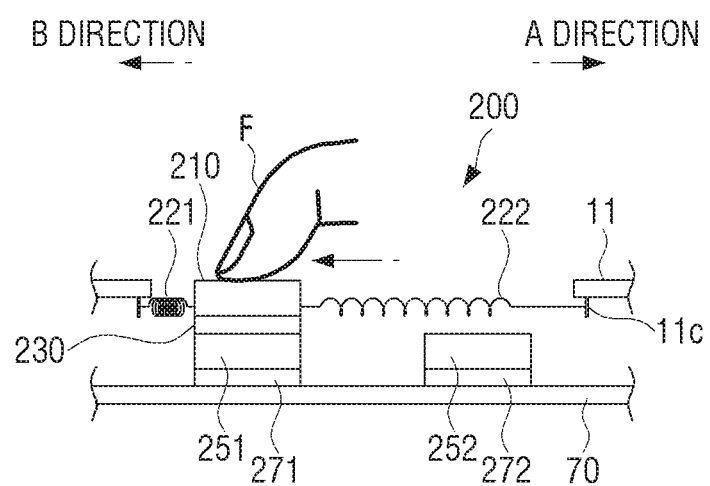
FIG. 16 is a diagram illustrating a state in which the movable member of the user manipulator of FIG. 15 is moved from an initial position to a set position according to an embodiment of the present disclosure.

FIG. 16 is a diagram provided to explain a method for manipulating the user manipulator 200 of FIG. 15 according to an embodiment of the present disclosure. Referring to FIG. 16, when a user moves the movable member 210 in the A or B direction by applying a force F thereon, the movable member 210 and the second electrode 230 may return to the initial positions with the elastic force of the first and the second elastic member 221, 222, as illustrated in FIG. 15.

Referring to FIG. 16, when a user pushes and moves the movable member 210 in the B direction from the initial position, the opposed areas between the second electrode 230 and a left first electrode 271 may gradually increase, and the capacitance value may also gradually increase. Thereby, as illustrated in FIG. 16, the second electrode 230 and the left first electrode 271 may fully overlap each other.

In the above state, when a user moves the movable member 210, the opposed areas between the second electrode 230 and the left first electrode 271 may gradually decrease and the capacitance value may also gradually decrease.

On the contrary, when a user pushes and moves the movable member 210 in the A direction from the initial position, the opposed areas between the second electrode 230 and a right first electrode 272 may gradually increase, and the capacitance value may gradually increase. Thereafter, when a user moves the movable member 210 while the second electrode 230 and the right first electrode 272 fully overlap with each other, the opposed areas between the second electrode 230 and the right first electrode 272 may gradually decrease and the capacitance value may also gradually decrease.

The pair of first electrodes 271, 272 and the dielectric materials 251, 252 formed on the pair of first electrodes 271, 272 may be differently set so that the capacitance values is different to each other. Thus, the electronic apparatus 1 to be interlocked with the input device 10 can perform different control operations according to a moving direction (A or B direction) of the movable member 210, the capacitance change amount generated between the second electrode 230 and the left first electrode 271 may be different from the capacitance change amount generated between the second electrode 230 and the right first electrode 272. Thus, the amount of at least one unit among the dielectric constant (ε), the area (S) and the distance (d) regarding the pair of dielectric materials 251, 252 may be differently applied.

The above exemplifies and explains the user manipulator implemented in a slide button form. However, as mentioned above, the user manipulator may be implemented in another form.

Figure 17:
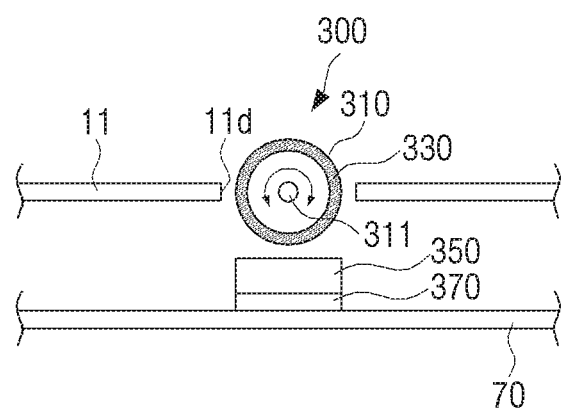
FIG. 17 is a diagram illustrating another example in which a movable member of a user manipulator is formed as a wheel shape according to an embodiment of the present disclosure.

FIG. 17 is a diagram provided to explain the user manipulator according to another embodiment of the present disclosure.

Referring to FIG. 17, the movable member of the user manipulator may be implemented in a wheel shape.

In FIG. 17, a user manipulator 300 includes a movable member 310 rotatable on the case, a first electrode 370 arranged to be fixed within the case, a second electrode 330 fixed on the movable member 310 and interlocked and rotated according to the rotation of the movable member, and a dielectric material 350 arranged between the first and the second electrodes.

The movable member 310 may be in the form of a wheel that can be rotated by user manipulation. The movable member 310 may be rotated clockwise or counter-clockwise based on a pair of rotation axis protrusions 311 which are formed to be projected on the both sides of the movable member 310. The pair of rotation axis protrusions 311 may be equipped so as to be rotated on a part of the case 11 (e.g., a part adjacent to a penetrated hole 11d of the case 11 in which part of the movable member 310 penetrates). The movable member 310 may include the non-conductive material.

The first electrode 370 formed on the upper surface of the printed circuit board 70 may be arranged under the movable member 310. In this case, the dielectric material 350 may be arranged between the movable member 310 and the first electrode 370. According to different embodiments, the user manipulator 300 may exclude the dielectric material 350. When the dielectric material 350 is provided in the user manipulator 300, the capacitance may be changed by having a greater interval. When the dielectric material 350 is excluded, the capacitance may be changed by having a smaller interval compared to the providing of the dielectric material 350. Thus, the dielectric material 350 may be used or excluded according to the size or the interval of the first and the second electrodes 330, 370 or according to various manufacturing conditions of the input device 10.

The second electrode 330 may be formed on the outer circumference of the movable member 310. The second electrode 330 may be manufactured to comprise a shape that changes gradually according to the outer circumference of the movable member 310. Thereby, when the movable member 310 is rotated, the opposed areas between the second electrode 330 and the first electrode 370 may be changed. Thus, the capacitance may be changed as the movable member 310 is rotated.

Figure 18:
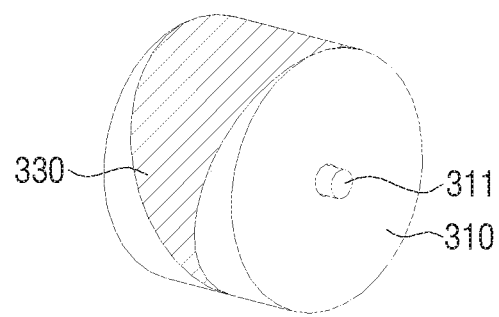
FIG. 18 is a perspective view illustrating the movable member of FIG. 17 according to an embodiment of the present disclosure.

FIG. 18 is a diagram illustrating a shape of the movable member and a shape of the second electrode 330 illustrated in FIG. 17 according to an embodiment of the present disclosure. Referring to FIG. 18, the second electrode 330 of the user manipulator 300 may be fixed and coupled according to the outer circumference of the movable member 310. The second electrode 330 may be formed to have a shape (e.g., a triangle shape) in which the interval gradually decreases from one end to the other end.

Figures 19A, 19B:
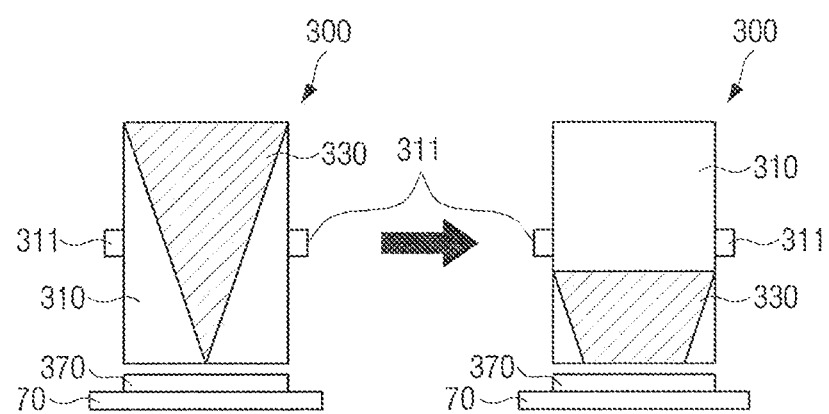
FIGS. 19A and 19B are diagrams provided to explain a process in which the opposed areas between a first electrode and a second electrode increases when the movable member of the user manipulator in FIG. 18 rotates according to an embodiment of the present disclosure.

FIGS. 19A and 19B are diagrams illustrating a process in which the movable member of FIG. 17 is rotated according to an embodiment of the present disclosure. The initial position of the second electrode 330 of the user manipulator 300 may be set to be at a position in which the opposed areas between the second electrode 330 and the first electrode 370 becomes zero, as illustrated in FIG. 19A. At the initial state, when a user rotates the movable member 310, the opposed areas between the second electrode 330 and the first electrode 370 may gradually increase, as illustrated in FIG. 19B. Thus, the capacitance may also gradually increase. When a user rotates the movable member 310 toward the contrary direction, the opposed areas between the second electrode 330 and the first electrode 370 may gradually decrease. Thus, the capacitance may also gradually decrease.

Referring to FIGS. 19A and 19B, a user may change the capacitance by rotating the movable member 310 clockwise or counter-clockwise, and thus, the signal outputted from the input device 10 may be changed. Thereby, the electronic apparatus 1 may perform various control operations.

The user manipulator 300 explained in FIGS. 17, 18, 19A and 19B may be a non-restoring type in which the movable member 310 may not automatically return to the initial position, however, the user manipulator 300 may be implemented in a restoring type. For example, the user manipulator 300 may be manufactured to be a restoring type by arranging the elastic member (e.g., a torsion spring, not illustrated) between one of the pair of rotation axis protrusions 311 of the movable member 310 and the case 11. Regarding the user manipulator 300 of the restoring type, when a user moves the movable member 310 by rotating the movable member 310 from the initial position a certain angle clockwise or counter-clockwise, the movable member 310 may return to the initial position with the elastic force of the elastic member.

Meanwhile, differently from the above, the angle of the movable member 310 may be set so that the initial position of the first electrode 370 is set on the position in which the opposed areas between the second electrode 330 and the first electrode 370 is maximized.

FIGS. 17, 18, 19A and 19B explain the embodiment in which the area between the electrodes is varied according to the rotation of the user manipulator. However, it may be implemented that the distance between the electrodes is varied according to the rotation of the user manipulator.

Figure 20:
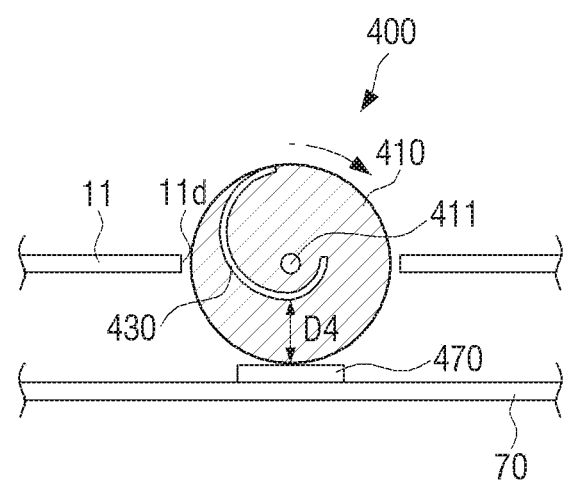
FIG. 20 is a diagram illustrating another example in which the movable member of the user manipulator is formed to be a wheel shape, and the first electrode is embedded inside the movable member according to an embodiment of the present disclosure.
Figure 21:
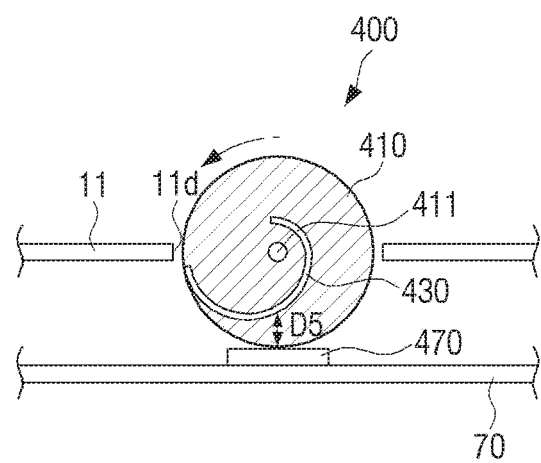
FIG. 21 is a diagram illustrating an example in which the interval between the first and the second electrodes becomes narrower, as the movable member of the user manipulator in FIG. 20 rotates according to an embodiment of the present disclosure.

FIGS. 20 and 21 are diagrams provided to explain the operation of the user manipulator according to another embodiment of the present disclosure. Specifically, FIGS. 20 and 21 illustrate an example of the user manipulator in which a movable member 410 may be formed to have a wheel shape, and a second electrode 430 may be embedded inside the movable member.

FIG. 21 is a diagram illustrating an example in which the interval between the first and the second electrodes becomes narrower, as the movable member of the user manipulator is rotated with a user manipulation from the initial position illustrated in FIG. 20 according to an embodiment of the present disclosure.

Referring to FIG. 20, a user manipulator 400 may include the movable member 410 having a wheel shape, a first electrode 470, and the second electrode 430.

The movable member 410 may include the non-conductive material, and equipped so as to be rotated on the case 11 with a pair of rotation axis protrusions 411 projected on both sides of the movable member 410. In this case, part of the movable member 410 may be projected externally from the case 11 through the penetrated hole 11d of the case 11 so that the movable member 410 may be rotated by a user.

The second electrode 430 may include a conductive metal strip, and be embedded in the movable member 410. Referring to FIG. 20, the second electrode 430 may be embedded inside the movable member 410, and formed to be bent gradually toward the center of the movable member 410 from a position adjacent to the surface of the movable member 410, i.e., the pair of rotation axis 411. The first electrode 470 may be fixed on the printed circuit board 70 under the movable member 410. Thereby, when the movable member 410 is rotated, the distance between the first electrode 470 and the second electrode 430 may be changed, and thus, the capacitance may be changed.

The user manipulator 400 configured as described above may exclude the dielectric material, and the movable member 410 may be non-conductive material. However, various embodiments of the present disclosure are not limited thereto in that the movable member may include the dielectric material having a certain dielectric constant.

The initial position of the second electrode 430 may be set to be displaced from the first electrode 470 by certain distance D4, as illustrated in FIG. 20.

When the movable member 410 is rotated counter-clockwise by a user, as illustrated in FIG. 21, the distance between the first electrode 470 and the second electrode 430 may gradually decrease, and thus, the capacitance may gradually increase. On the contrary, when the movable member 410 is rotated clockwise, the distance between the first electrode 470 and the second electrode 430 may gradually increase, and thus, the capacitance may gradually decrease. Thus, when the second electrode 430 is rotated from the initial position of FIG. 20 to the position of FIG. 21, a distance D5 between the first electrode 470 and the second electrode 430 may be arranged to be shorter than the distance D4 between the first electrode 470 and the second electrode 430 on the initial position. In this case, the capacitance may gradually increase.

Although the user manipulator 400 may be non-restoring type in which the movable member 410 does not automatically return to the initial position, the user manipulator 400 may be also implemented in a restoring type by arranging the elastic member (e.g., a torsion spring, not illustrated) between any one of the pair of rotation axis protrusions 411 of the movable member 410 and the case 11. Regarding the restoring type of the user manipulator 400, when a user moves the movable member 410 by rotating the movable member 410 a certain angle clockwise or counter-clockwise from the initial position, the movable member 410 may return to the initial position with the elastic force of the elastic member.

The above explains the various embodiments of the present disclosure in which the user manipulator is implemented in a slide button or a wheel button. However, the user manipulator may be implemented in various forms. For example, it may be implemented that the capacitance may be changed when a user pushes the user manipulator and the button is pushed into the interior of the case 11. Further, it may be implemented that the capacitance may be changed by gripping and pulling both ends of the case 11 or pushing toward the middle direction.

The input device 10 may output the different signals according to the manipulating of the user manipulator, and the electronic apparatus 1 may perform various control operations according to the signals.

The electronic apparatus 1 may be implemented in various forms of devices such as portable phone, tablet PC, laptop PC, monitor, TV, kiosk, video wall, electronic frame, and MP3 player. Further, the electronic apparatus 1 may be implemented in new types of devices, which are not exemplified herein. Also, the electronic apparatus 1 may be a user terminal apparatus or a display apparatus.

A following will specifically explain the constitution and the operation of the electronic apparatus 1.

Figure 22:
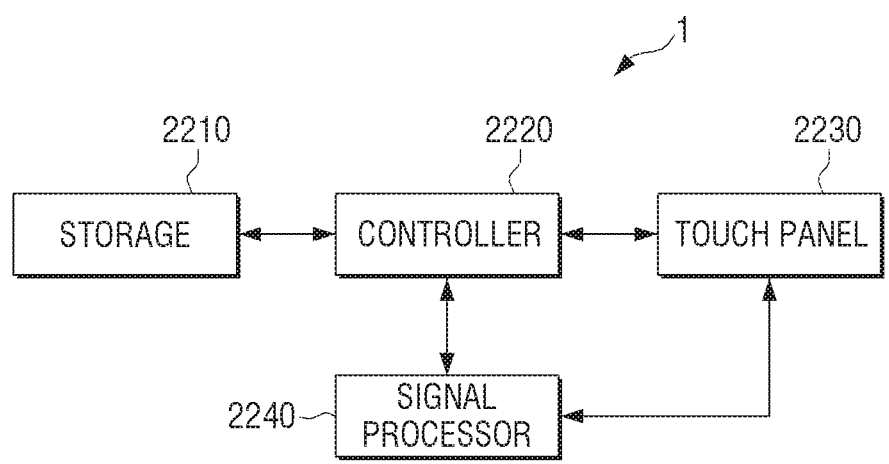
FIG. 22 is a block diagram illustrating a constitution of an electronic apparatus according to an embodiment according to an embodiment of the present disclosure.

FIG. 22 is a block diagram illustrating the constitution of an electronic apparatus according to an embodiment of the present disclosure.

Referring to FIG. 22, the electronic apparatus 1 includes a storage 2210, a controller 2220, a touch panel 2230, and a signal processor 2240.

The touch panel 2230 is a unit to perform the displaying. The touch panel 2230 may perform the display function, and separately sense the touching or the hovering of an external tool such as hand or pen. When using the input device 10 according to the above various embodiments of the present disclosure, the touch panel 2230 may receive a signal generated from the input device 10. The signal received from the input device 10 may vary depending on the driving method of the touch panel 2230. When implemented with an ECR method as described above, the touch panel 2230 may receive the electromagnetic signal generated from the input device 10.

The signal processor 2240 may receive the inputting of the signal generated from the input device touching or approaching the touch panel, and detect the frequency of the signal. For convenience of explanation, the signal received through the touch panel 2230 may be referred to as a response signal. When using the input device 10 of an ECR method as described above, the electromagnetic signal generated from the input device 10 may be delivered to the touch panel 2230 through the conductive tip. Thus, when the electromagnetic signal, i.e., the response signal, is introduced through the electrodes within the touch panel 2230, the signal processor 2240 may perform various signal processing regarding the received response signal. For example, the signal processor 2240 may amplify the response signal by using an amplifier. Further, the signal processor 2240 may perform the signal processing to perform a differential-amplify based on the two response signals. Further, the signal processor 2240 may perform the signal processing to detect information only within a preset frequency area by calculating Fourier transformation regarding the received response signal. The method and the order of the signal processing may vary depending on cases, and another signal processing may be performed.

According to the above various embodiments of the present disclosure, when the input device 10 includes the user manipulator 100, the input device 10 may resonate on the different frequencies according to the manipulating state of the user manipulator 100. Thus, the frequency features detected by the signal processor 2240 may vary depending on the manipulating state of the user manipulator 100. The signal processor 2240 may provide the information regarding the detected frequency features to the controller 2220.

The controller 2220 may perform the function corresponding to the movement of the input device. For example, when a program supporting a writing function is running, the controller 2220 may perform the function to display writing trajectories on the touch panel 2230 according to the movement of the input device. Further, when the screen displays a content, an icon, or a menu, the controller 2220 may perform a function to select and implement a specific content, icon, or menu according to the touching or the hovering of the input device.

While performing the above function, the controller 2220 may differently adjust the implementing options of the function by considering the frequency features of the signal inputted from the input device. Specifically, when the operation to display the writing trajectories according to the movement of the input device 10 is performed, the controller 2220 may differently adjust options such as thickness, brightness, color, chroma, size, and shape of the writing trajectories according to the manipulating state of the user manipulator 100.

Besides, the controller 2220 may perform the control operation to adjust the options such as functions matched with the input device, font type, applied language, touch panel brightness, contrast, touch sensitivity, resolution, font size, volume and channel tuning according to the manipulating state of the user manipulator 100.

For example, when a user moves or rotates the movable member toward one direction, the controller 2220 may change the thickness of the writing trajectories to be thicker or thinner according to the moving direction or the rotating direction. Regarding the example of the brightness adjusting, the controller 2220 may change the writing trajectories to be lighter or deeper according to the moving direction or the rotating direction. Likewise, the color, the chroma, and the size may be changed. Further, the functions indicate a pen function, a brush pen function, a paint function, a color filling function, and an erasing function. The controller 2220 may sequentially change the above functions according to the moving direction or the rotating direction of the movable member. Further, the controller 2220 may change the size of the area where the above functions are applied to be greater or smaller according to the moving direction or the rotating direction of the movable member.

Besides, the implementing options may further include content changing, web page changing, content scrolling, content display size adjusting, and content reproducing time adjusting.

For example, the controller 2220 may perform the control operation to change the displayed content into another content or to change the content display area size to be greater or smaller. Examples of the above control operation will be described below in connection with drawings.

The storage 2210 is a unit in which various programs and data used in the electronic apparatus are stored. As described above, the controller 2220 may perform the different control operations, i.e., the option changing, based on the size of the frequency detected from the signal generated from the input device 10. Further, when the basic frequency information of the signal generated from the input device 10 is stored in the storage 2210, the controller 2220 may compare the frequency detected from the signal generated from the input device 10 with the basic frequency, and perform the different control operations based on the difference value. The basic frequency information may be updated.

Figure 23:
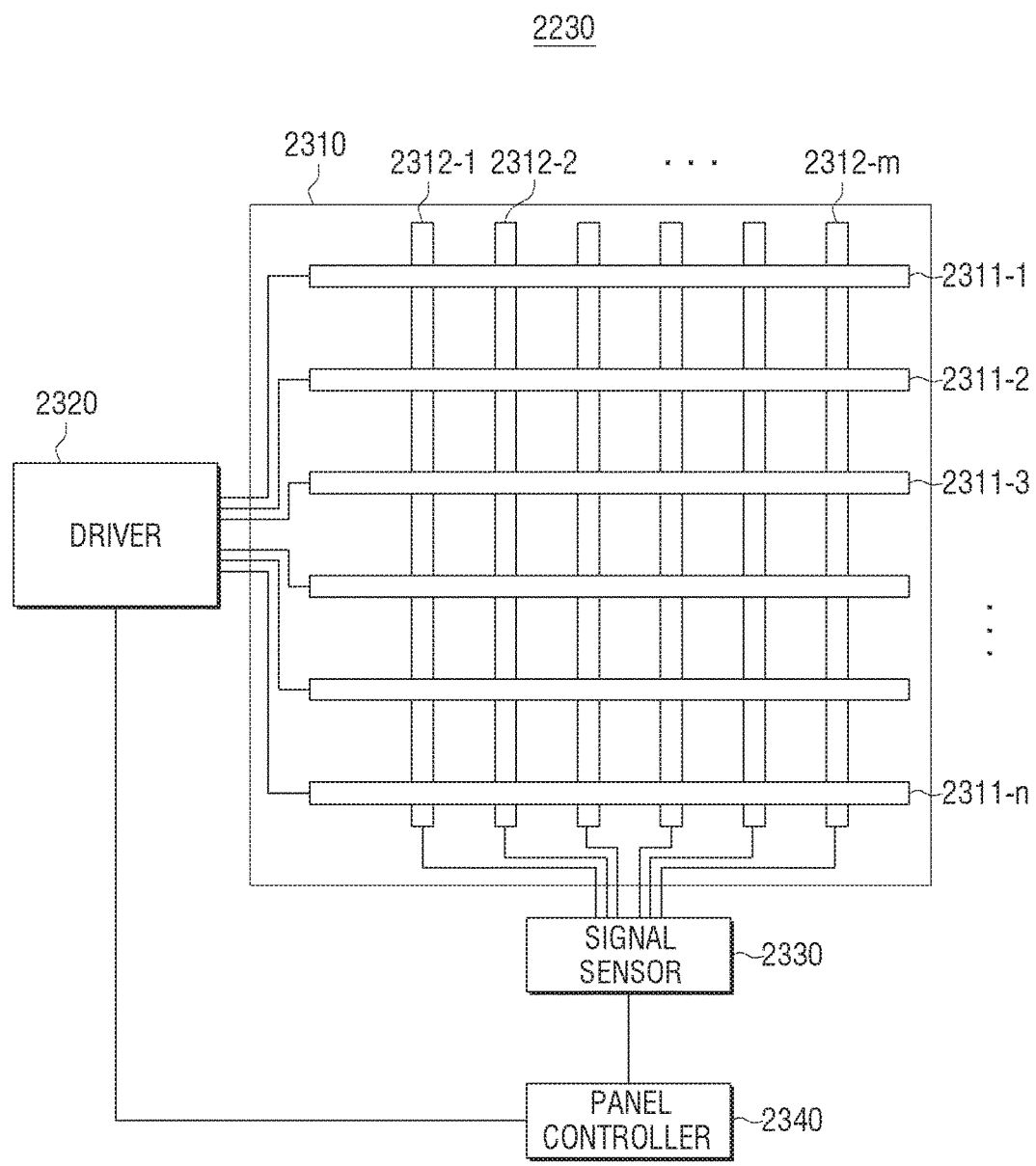
FIG. 23 is a diagram exemplifying a detailed constitution of a touch panel according to an embodiment of the present disclosure.

FIG. 23 is a diagram illustrating the detailed constitution of the touch panel according to an embodiment of the present disclosure. Referring to FIG. 23, the touch panel 2230 includes an electrode 2310, a driver 2320, a signal sensor 2330, and a panel controller 2340.

Referring to FIG. 23, the electrode 2310 includes a plurality of electrodes arranged in the horizontal direction and the vertical direction. For example, the electrode 2310 may include a plurality of horizontal electrodes 2311-1~2311-*n* and a plurality of vertical electrodes 2312-1~2312-*m*.

The plurality of horizontal electrodes 2311-1~2311-*n* and the plurality of vertical electrodes 2312-1~2312-*m* may be transparent electrodes, i.e., indium tin oxide (ITO). The plurality of horizontal electrodes 2311-1~2311-*n* may be electrodes transmitting the electromagnetic signal externally. The plurality of vertical electrodes 2312-1~2312-*m* may be electrodes receiving the electromagnetic signal generated from the input device such as a finger or a pen.

Although FIG. 23 illustrates that the shape of the electrodes comprises a simple rectangular shape and the arrangement comprises a matrix form, the shape of the electrodes may be implemented to be a complex shape different to that illustrated in FIG. 23.

The driver 2320 may deliver an electromagnetic signal to the resonance circuit R (see FIG. 13) when an object approaches the touch panel 2230 through capacitive coupling by approving a driving signal to the electrodes within the electrode 2310. The driver 2320 may approve a uniform driving signal to the electrodes within the electrode 2310 based on a plurality of electrodes. The driving signal may be a sine wave shape signal having a pre-determined resonance frequency. When the electronic apparatus 1 is turned on, the driver 2320 may provide the driving signal to the electrode 2310 periodically. When the driving signal is approved to each electrode of the electrode 2310 with the driver 2320, the electromagnetic signal of each electrode may be introduced to the conductive tip 20 of the input device 10 when the input device 10 approaches or touches the touch panel 2230. The electromagnetic signal introduced to the input device 10 may be delivered to the circuit 101, and the circuit 101 may output the electromagnetic signal by being resonated according to the delivering. The outputted electromagnetic signal may be introduced to at least one electrode among a plurality of electrodes within the electrode 2310. The introduced electromagnetic signal may be delivered to the signal sensor 2330.

The signal sensor 2330 may receive the signal from each electrode within the electrode 2310 on a section in which the driver 2320 does not approve the driving signal to the electrode 2310. The signal sensor 2330 may sequentially receive the electromagnetic signal based on one electrode, or receive the electromagnetic signal of all the electrodes based on a plurality of electrodes. For convenience of explanation, the signal inputted from the input device 10 may be referred to as response signal.

The panel controller 2340 may control the driver 2320 and the signal sensor 2330 so that the approving of the driving signal and the receiving of the response signal is alternately performed.

Although FIG. 23 illustrates and explains one embodiment of the detailed constitution of the touch panel 2230, the touch panel 2230 may have different constitutions to that illustrated in FIG. 23. For example, the above describes that the electrode 2310 includes a plurality of electrodes, however, the electrode 2310 may be implemented as a plurality of antenna loops. Further, the electrode 2310 may be implemented in a form in which a plurality of electrodes and a plurality of antenna loops are included. Further, FIG. 23 illustrates and explains that the driver 2320, the signal sensor 2330, and the panel controller 2340 are separate units, however, the functions of the above units may be performed by one unit (e.g., a controller), when implemented. Further, the electrode 2310 within the touch panel 2230 may be included in the display panel, or may be implemented as a separate panel and arranged on the front or the back of the display panel.

When the response signal is sensed, the touch panel 2230 may provide the sensed response signal to the signal processor 2240, and the signal processor 2240 may process the response signal described above and provide the processing result to the controller 2220.

The controller 2220 may compare a size of the response signal that is received through a plurality of horizontal electrodes with a size of the response signal that is received through a plurality of vertical electrodes, and confirm the input position of the input device such as a finger and a pen. For example, when the size of the response signal of the first horizontal electrode 2311-1 is greater than the size of the response signal of the other horizontal electrodes 2311-2~2311-n, and when the size of the response signal of the second vertical electrode 2312-2 is greater than the size of the response signal of the other vertical electrodes 2312-1, 2312-3~2312-m, the panel controller 2340 may determine the position in which the first horizontal electrode 2311-1 and the second vertical electrode 2312-2 are crossed with each other to be the position of the input device 10. When the position of the input device 10 is sensed and the frequency feature of the response signal is detected, the controller 2220 may perform the control operation corresponding to the frequency size and position. When the state of the user manipulator is changed as described above, the frequency of the response signal may be changed.

Figure 24:
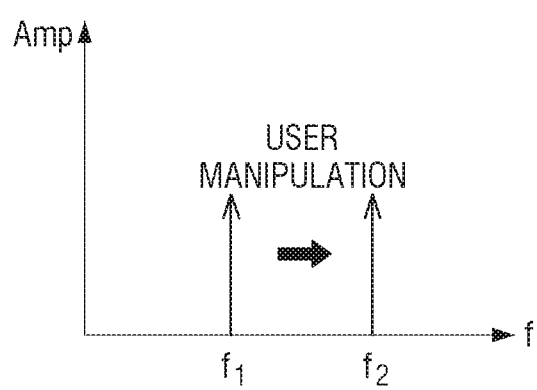
FIG. 24 is a graph illustrating changes of the frequency features according to a user manipulation according to an embodiment of the present disclosure.

FIG. 24 is a diagram illustrating the frequency change according to the manipulating of the user manipulator according to an embodiment of the present disclosure. Referring to FIG. 24, the frequency may change from f1 to f2. When the function of the input device is a pen function and when the function of the user manipulator 100 is set to adjust thickness, the controller 2220 may display the pen thickness to be 0.1 mm at f1 state and change the pen thickness to be 0.3 mm at f2. When the manipulating of the user manipulator 100 is performed gradually, the pen thickness may be also changed gradually.

Figure 25:
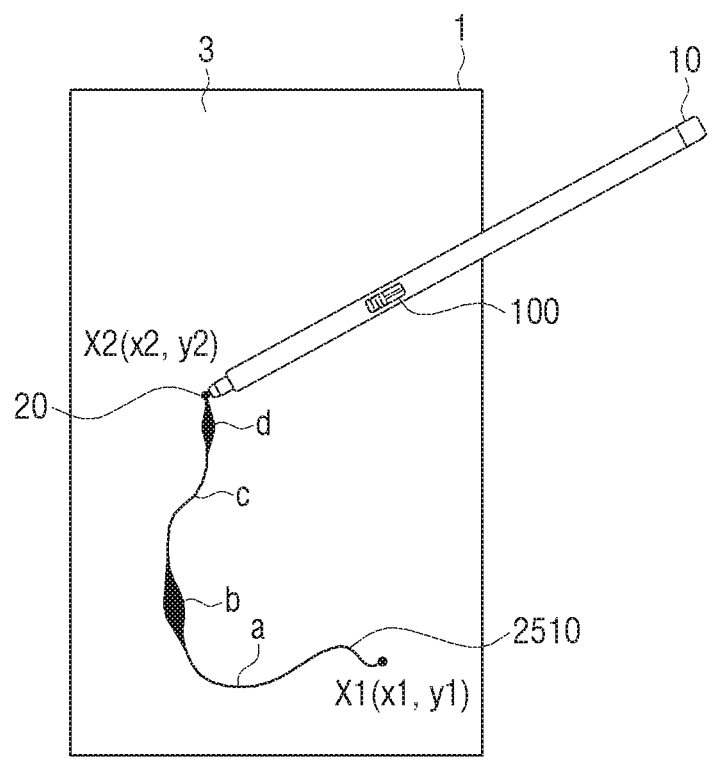
FIGS. 25, 26A, 26B, 27A, 27B, 28A, 28B, and 29 to 33 are diagrams provided to explain examples of various operations of the electronic apparatus according to the manipulating state of the user manipulator of the input device according to an embodiment of the present disclosure.

FIG. 25 is a diagram provided to explain a method for changing the thickness of writing trajectories according to the manipulating of the user manipulator 100 according to an embodiment of the present disclosure. Referring to FIG. 25, a user manipulates the user manipulator 100 by touching point X1 (x1, y1) within the screen by using the input device 10 and drawing to another point X2 (x2, y2). The controller 2220 may display the drawn path, i.e., the writing trajectories 2510.

Referring to FIG. 25, the thickness of the writing trajectories 2510 may be changed to be thinner or thicker according to the manipulating state of the user manipulator 100. When the user manipulator 100 is not manipulated on the initial drawing section a, the writing trajectories 2510 may be displayed to be a basic thickness. When a user slides (or rotates or presses) the user manipulator 100 in a first direction and slides (or rotates or presses) in a second direction again while drawing, the thickness may gradually become thicker and gradually become thinner again (b section). Thereafter, the thickness may be variously adjusted according to a user manipulation (c, d sections). A user may draw various forms of pictures by using the above function.

Although FIG. 25 explains an example in which the thickness of the writing trajectories may be changed when the user manipulator is manipulated during the writing, the brightness, the color, the chroma, the function, the size, the shape, the font, and the language of the writing trajectories may be also changed using the user manipulator 100 of the input device 10.

FIG. 25 is a diagram provided to explain the operation of the electronic apparatus 1 in the embodiment in which the input device 10 includes only the user manipulator 100. However, according to another embodiment of the present disclosure, the pen pressure module 50 may also be used together with the user manipulator 100, as described above.

Figure 26A:
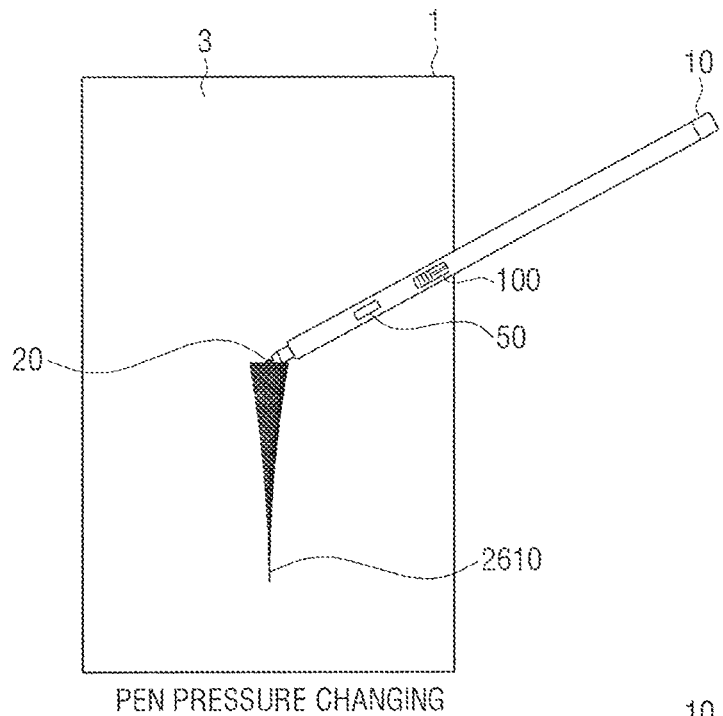
Figure 26B:
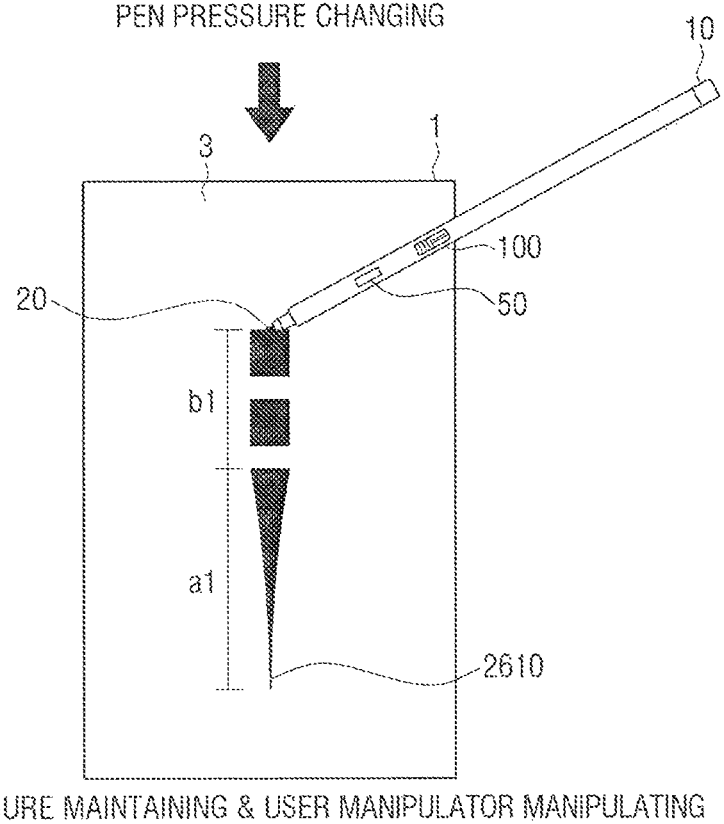

FIGS. 26A and 26B are diagrams provided to explain an example in which the pen pressure module 50 and the user manipulator 100 are used together according to an embodiment of the present disclosure.

Referring to FIGS. 26A and 26B, when a user gradually pushes on the screen 3 of the electronic apparatus 1 using a substantial amount of force when using the input device 10, a thickness of the writing trajectories 2610 may gradually become thicker according to the pen pressure as illustrated in FIG. 26A. In the above state, when a user manipulates the user manipulator 100, the controller 2220 may change the shape of the writing trajectories according to the manipulating state. Referring to FIG. 26B, the writing trajectories may be displayed to be a line shape (a1 section) before the manipulating of the user manipulator 100 and changed to be dotted-line shape (b1 section) according to the manipulating of the user manipulator 100.

Figure 27A:
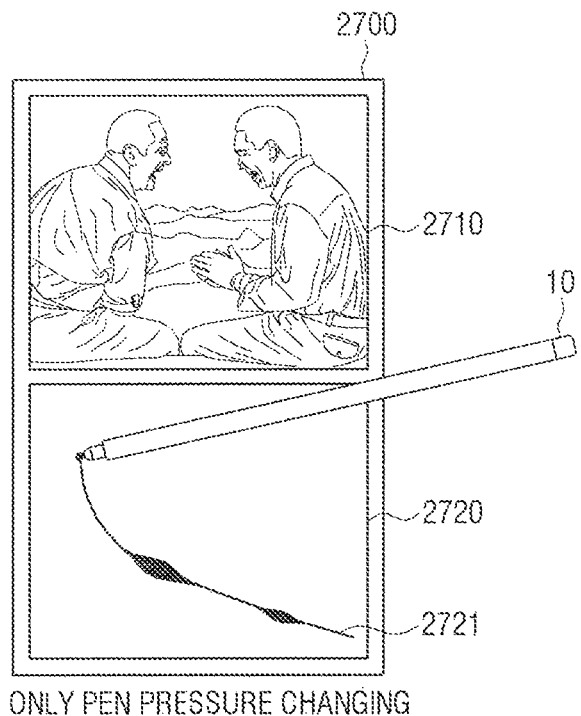
Figure 27B:
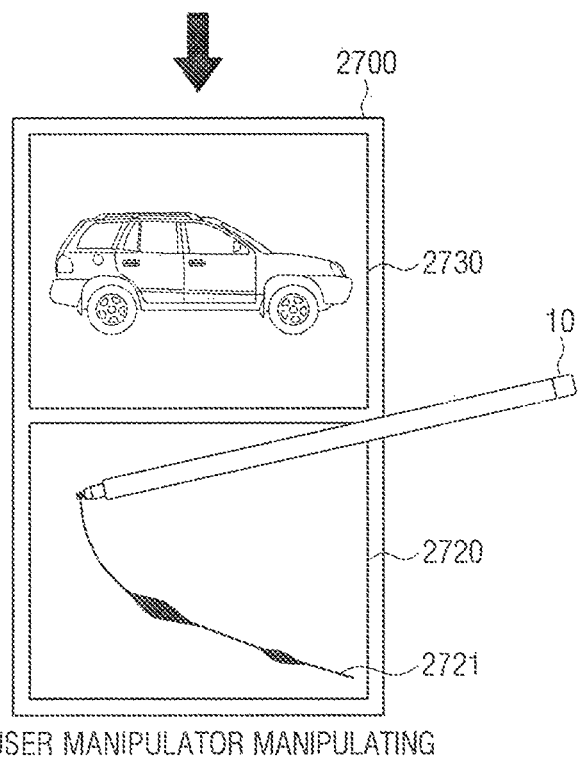

FIGS. 27A and 27B are diagrams provided to explain another operation of the embodiment in which the pen pressure module 50 and the user manipulator 100 are used together according to an embodiment of the present disclosure.

Referring to FIGS. 27A and 27B, the electronic apparatus 1 may display a screen 2700 including both of content 2710 and a memo area 2720. The content 2710 may be a photograph or a video, however, it may not be limited to the above. The text or picture drawn by a user on the memo area 2720 may be combined with the content 2710 and reconfigured to be a new content. Thus, the text or the picture may be stored as a separate file. When a user draws on the memo area 2720, writing trajectories 2721 may be displayed according to the drawing. FIG. 27A illustrates that the writing trajectories 2721 is changed when a user changes the pen pressure and draws.

When a user manipulates the user manipulator 100 in the above state, the controller 2220 may change the content 2710 within the screen 2700 into a new content 2730. The new content 2730 may be content right before or right after the content 2710 on the content list. When the manipulating degree of the user manipulator 100 is great or quick, the new content 2730 may be content before or after several contents from the content 2710 on the content list.

Although FIGS. 27A and 27B explain the embodiment in which the content is changed by a user manipulation, various embodiments of the present disclosure are not limited thereto. For example, when the image displayed on the electronic apparatus 1 is larger than the screen of the display, the image may be scrolled according to the manipulating of the user manipulator 100. Further, the content display size may be expanded or reduced. When the content is a video content, fast forwarding or rewinding may be performed according to the manipulating of the user manipulator 100, which changes the reproducing time.

Figure 28A:
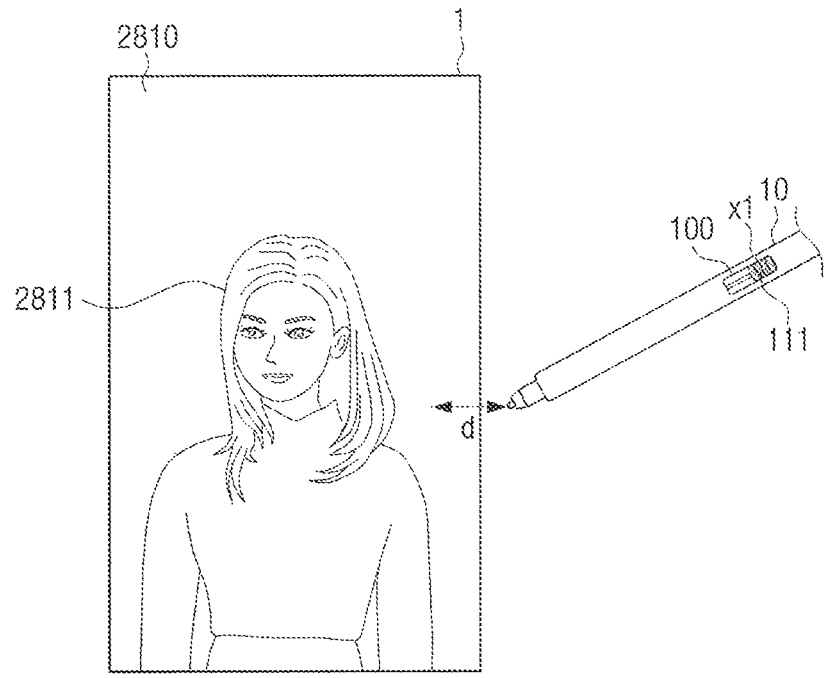
Figure 28B:
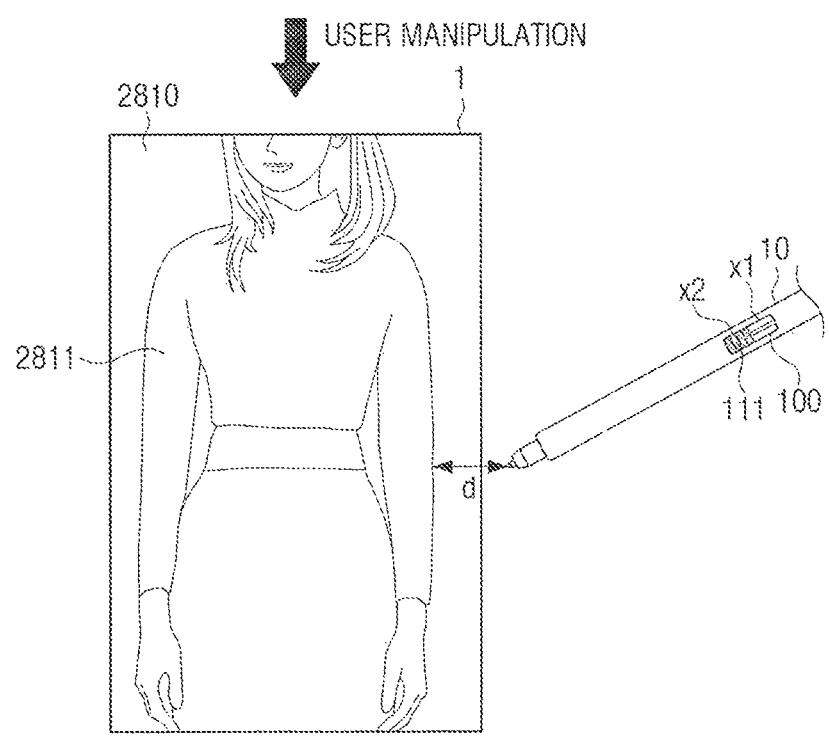

FIGS. 28A and 28B are diagrams provided to explain another operation example of the embodiment in which the pen pressure module 50 and the user manipulator 100 are used together according to an embodiment of the present disclosure.

Referring to FIGS. 28A and 28B, a user may touch or approach the input device 10 on the touch panel 2230 of the electronic apparatus 1 while an image 2810 including an object 2811 is displayed on the display 3 of the electronic apparatus 1. FIG. 28A illustrates that the knob 111 of the user manipulator 100 is at an x1 position at the hovering state in which the displacement has a certain distance (d) from the touch panel 2230. In this case, the upper section of the image 2810 may be displayed on the electronic apparatus 1.

When a user moves the knob 111 of the user manipulator 100 to x2 position as illustrated in FIG. 28B, the image 2810 may be scrolled down. Thereby, the lower section of the image 2810 may be displayed as illustrated in FIG. 28B.

Although FIGS. 28A and 28B illustrate the control operation to scroll the image according to the user manipulation, the image size adjusting may be also performed.

Further, the above describes that the content comprises a still image or a video, however embodiments of the present disclose is not limited thereto. For example, the content may include various types of content such as a web page or a text document.

Figure 29:
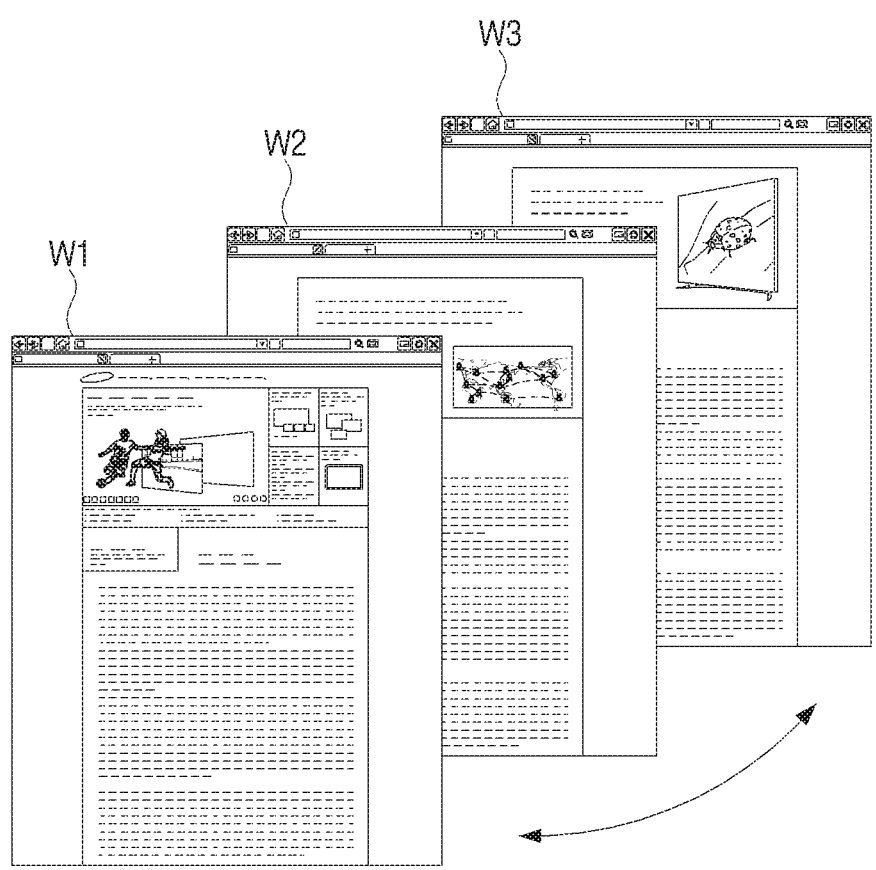

FIG. 29 is a diagram provided to explain the operation to perform the web page changing according to a user manipulation according to an embodiment of the present disclosure. Referring to FIG. 29, the controller 2220 may display a web page. A user may select various texts, images, and menus within the web page and confirm various web pages W1, W2, W3. A user may manipulate the user manipulator 100 when he wants to view another web page while viewing one web page W2. The controller 2220 may display the previous web page W1 or the posterior web page W3 according to the manipulating direction of the user manipulator 100.

Referring to FIG. 29, the above embodiments exemplify and explain the changing of the thickness and the shape of writing trajectories and the contents and scrolling of images are scrolled according to the changing of the pen pressure and the manipulating of the user manipulator. However, other various functions may be matched with the changing of the pen pressure and the manipulating of the user manipulation.

Further, the controller 2220 may display a user interface (UI) that can be controlled with the user manipulator on the touch panel 2230. A user may select the function of the input device 10 by using UI.

Figure 30:
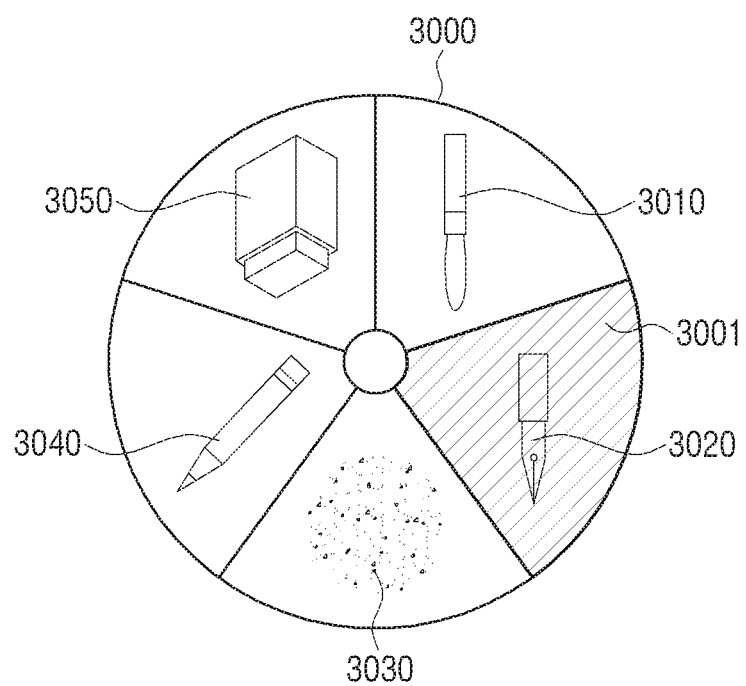
Figure 31:
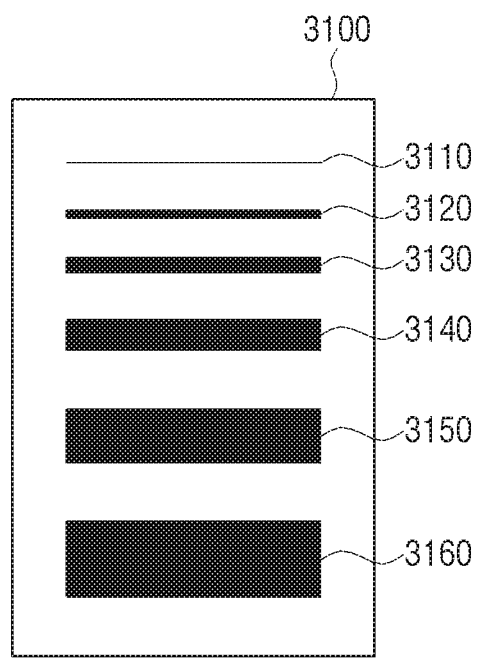
Figure 32:
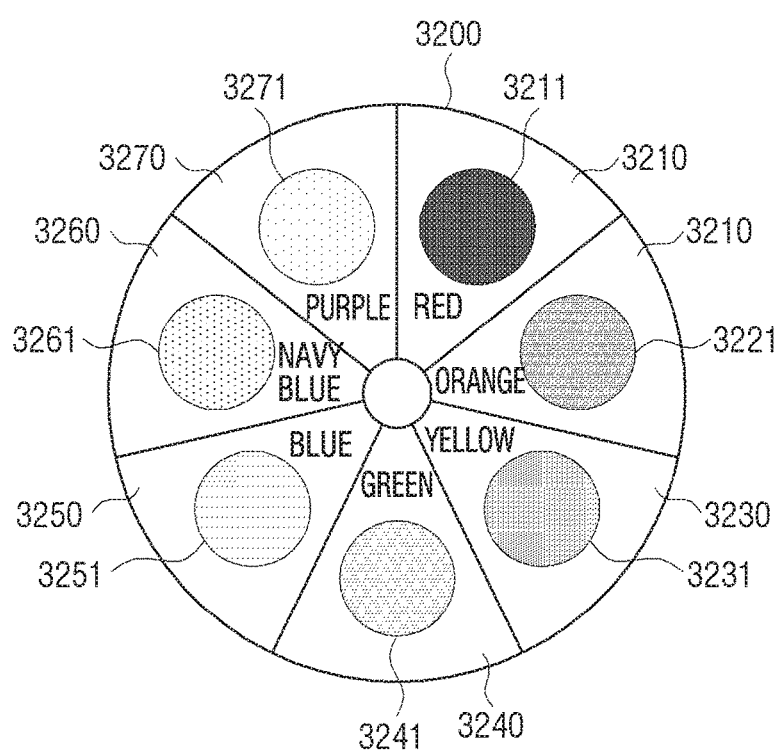

FIGS. 30 to 32 are diagrams illustrating the operation of the electronic apparatus 1 that can select the function by using a UI according to various embodiments of the present disclosure.

Referring to FIG. 30, the controller 2220 may display a UI 3000 including a plurality of menus 3010~3050 on the touch panel 2230. The controller 2220 may display the UI 3000 when a preset event occurs. For example, when an event in which the input device 10 touches the touch panel 2230 or approaches the touch panel 2230 within a certain distance occurs, the controller 2220 may display the UI 3000. Further, when an event in which the input device 10 is separated from the inserting hole 5 of the electronic apparatus 1 occurs, the controller 2220 may display the UI 3000 for a certain amount of time. Besides, when an event in which a user directly selects the UI display menu or an event in which the user manipulator 100 is initially manipulated occurs, the controller 2220 may display the UI 3000.

At the above state, when the frequency features of the signal received from the input device 10 is changed, the controller 2220 may sequentially change the items to be selected among a plurality of menus.

Referring to FIG. 30, the UI 3000 may be displayed in a circle shape, and menus 3010~3050 matched with various functions may be included. Each of the menus 3010~3050 may be displayed as icons. FIG. 30 illustrates icon 3010 indicating a paint brush function, icon 3020 indicating a fountain pen function, icon 3030 indicating a brush function, icon 3040 indicating a pencil function, and icon 3050 indicating an eraser function.

When the movable member 110 of the user manipulator 100 is slid and moved toward a first direction from the initial position, a highlight 3001 may be displayed on one of the menus 3010~3050 and sequentially moved clockwise. When the movable member 110 is slid and moved toward a second direction on the contrary, the highlight 3001 may be sequentially moved counter-clockwise. A user may slide and move the movable member 110 toward the first or the second direction, and stop the manipulating on the state in which the highlight 3001 is displayed on one desired menu.

When the manipulating stops and a certain amount of time (e.g., three seconds) passes, the controller 2220 may match the function corresponding to the menu marked by the highlight 3001 with the input device 10. Further, when the input device 10 touches the touch panel 2230 at the state in which the manipulating of the user manipulator stops, the controller 2220 may match the function corresponding to the menu marked by the highlight 3001 with the input device 10. The menu selecting may be performed with the pen pressure changing as well as the manipulating of the user manipulator.

FIG. 31 illustrates another example of a UI according to an embodiment of the present disclosure. Referring to FIG. 31, the touch panel 2230 may display a UI 3100 including a plurality of menus 3110~3160 to select different thicknesses. Each of the menus 3110~3160 may be displayed to be a line image form, however, various embodiments of the present disclosure are not limited thereto. For example, numbers corresponding to respective line thicknesses may be displayed.

Referring to FIG. 31, the controller 2220 may select one among a plurality of menus 3110~3160 according to the manipulating of the user manipulator. The controller 2220 may expand the menu size or the menu brightness so that the selected menu is distinguished from the other menus or the controller 2220 may display additional elements, such as a text or a sign, near to the selected menu to distinguish the selected menu from the other menus. When one of the menus is selected, the controller 2220 may map the selected thickness as an initial thickness of the input device 10.

FIG. 32 illustrates another example of a UI according to an embodiment of the present disclosure. Referring to FIG. 32, the touch panel 2230 may display a UI 3200 including a plurality of menus 3210~3270 to select different colors. The menus 3210~3270 may respectively include objects 3211~3271 corresponding to the colors. Further, the menus 3210~3270 may respectively include texts indicating the colors. Although FIG. 32 illustrates seven colors such as red, orange, yellow, green, blue, navy blue, and purple, other various color menus such as grey, black, and white may also be displayed. The controller 2220 may select one among a plurality of menus 3210~3270 according to the manipulating of the user manipulator. The selecting method is similar to the method of FIG. 30, which will not be further explained below.

Referring to FIG. 32, the above describes that the menu is selected according to the user manipulation on UIs providing a plurality of menus distinguished by one standard (e.g., function, thickness, and color). However, the distinguished standard may be varied according to the user manipulation in a manner that is different from the above. In this case, when a user manipulates the user manipulator 100, a plurality of UIs may be sequentially displayed.

Figure 33:
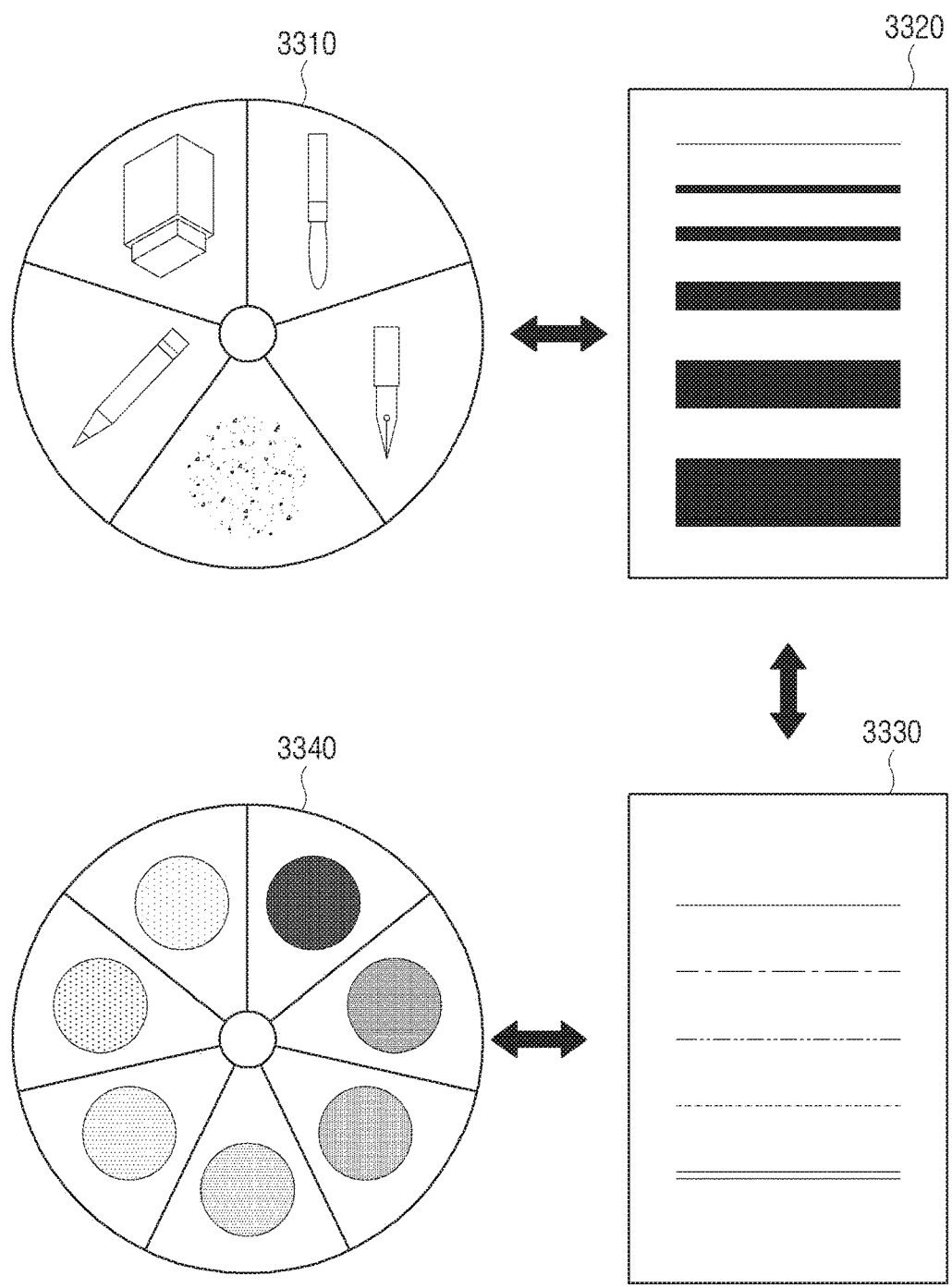

FIG. 33 is a diagram illustrating the operation of the electronic apparatus according to another embodiment of the present disclosure. Referring to FIG. 33, when a certain event occurs, the controller 2220 may display one UI 3310. When a user manipulates the user manipulator at the above state, other UIs 3320~3340 may be sequentially displayed. For example, UIs of FIGS. 30 to 32 may be sequentially displayed. When the user manipulator is manipulated in a first direction while one UI 3330 is displayed, the controller 2220 may display a next UI 3340. On the contrary, when the user manipulator is manipulated in a second direction contrary to the first direction, the controller 2220 may display a previous UI 3320. A user may finish the setting by touching the menu within the UI with the input device 10 while one UI is displayed.

Referring to FIG. 33, although the above describes methods for setting the functions of the input device 10 by using the pen pressure module or the user manipulator, a user may directly set the functions of the pen pressure module and the user manipulator through a setting screen according to another embodiment.

Figure 34:
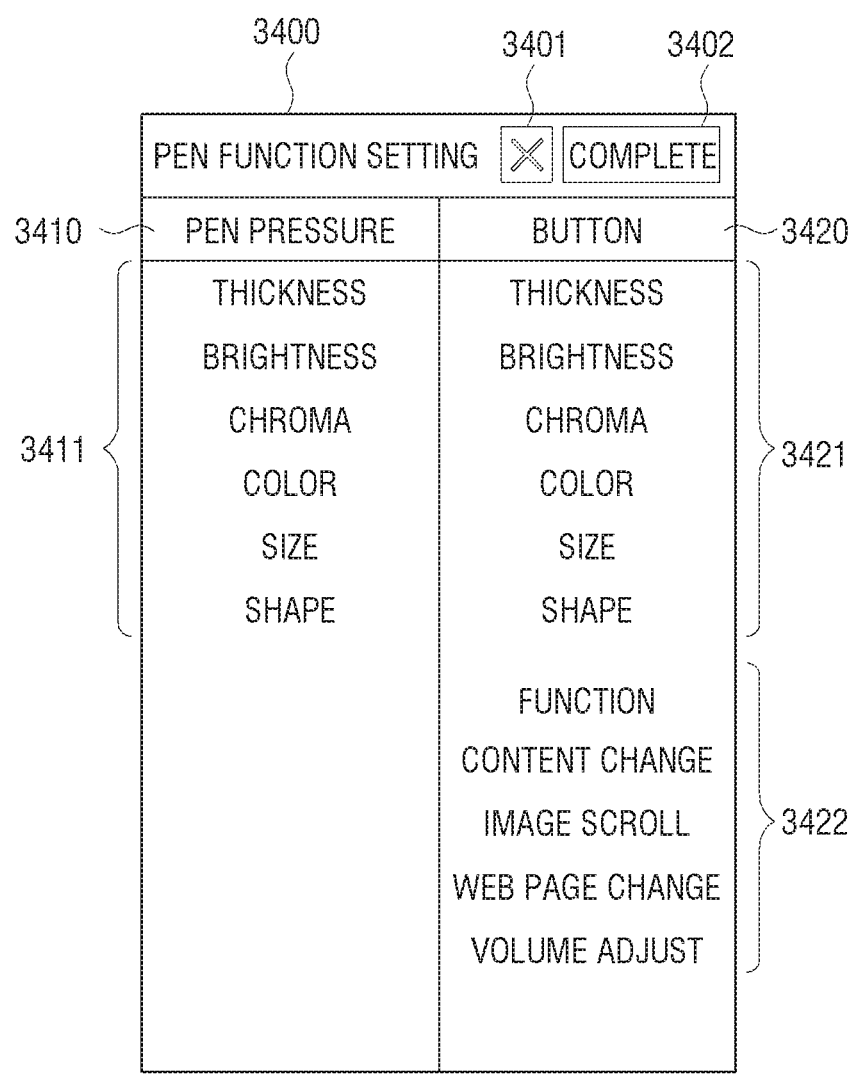
FIG. 34 is a diagram illustrating an example of a setting screen to set functions of a pen pressure module and a user manipulator according to an embodiment of the present disclosure.

FIG. 34 illustrates an example of a setting screen on the electronic apparatus according to another embodiment of the present disclosure. Referring to FIG. 34, the controller 2220 may display a setting screen 3400. The setting screen 3400 may include a first area 3410 to set functions matched with the pen pressure module and a second area 3420 to set functions matched with the buttons.

Referring to FIG. 43, the first area 3410 may display a plurality of menus 3411 that may be adjusted according to a changing of the pen pressure, and the second area 3420 may display a plurality of menus 3421, 3422 that may be adjusted according to the slide-moving or the rotating. The menus on the first and the second area may be uniform to each other, however, they may also be different to each other. FIG. 34 illustrates that functions that can be matched with the user manipulator are may be provided. For example, only the menus 3411 related with the writing may be matched with the changing of the pen pressure, and the menus 3421 related with the writing and the menus 3422 that can be manipulated only with the user manipulator may be matched with the user manipulator. A user may select each of the menus on the setting screen 3400. For example, a user may select "thickness" from the menus 3411 and select "shape" from the menus 3421. When the menu is selected, a user may finish the setting by selecting the complete menu 3402. Further, when the cancel icon 3401 is selected, the controller 2220 may erase the setting screen 3400. When the function setting completes, the controller 2220 may perform various forms of the control operations according to the set functions.

The above describes various interaction operations performed with the manipulating of the pen pressure module or the user manipulator provided on the input device 10. Further, as described above, the input device 10 may be implemented according to various embodiments of the present disclosure. The method for processing a signal of the electronic apparatus 1 may be variously changed according to an embodiment of the input device 10. A following will explain various processing methods of the signal outputted from the input device 10.

Figure 35:
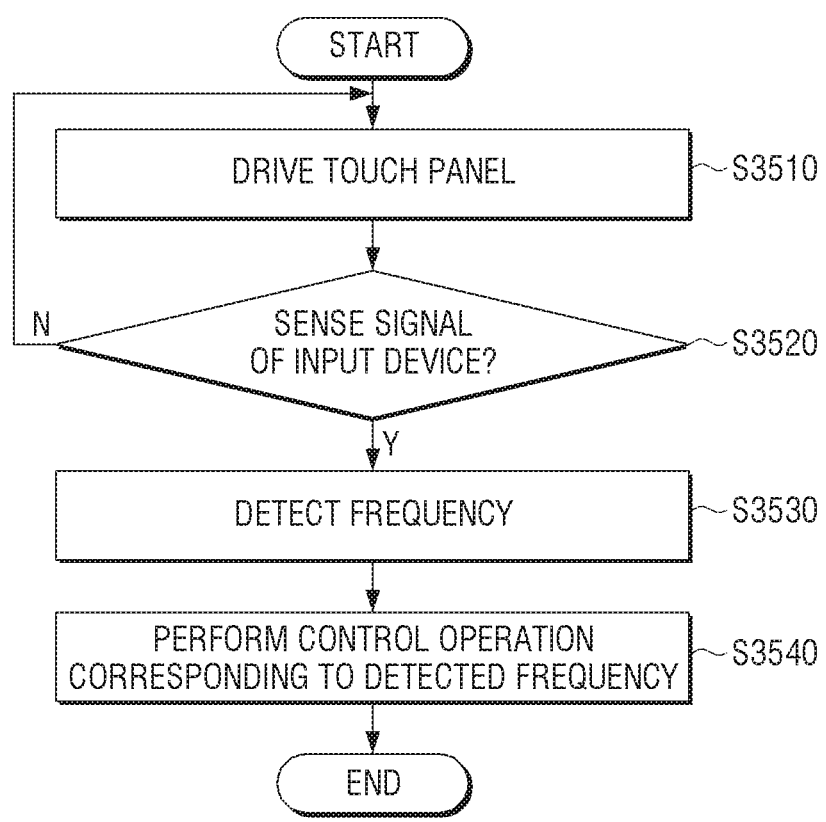
FIGS. 35 to 38 are flowcharts provided to explain a method for processing a signal of an electronic apparatus according to various embodiments of the present disclosure.

FIG. 35 is a flowchart explaining a method for processing a signal of the electronic apparatus according to an embodiment of the present disclosure. FIG. 35 illustrates the method for processing a signal when the input device includes the user manipulator or the pen pressure module only. When the user manipulator is included, the method for processing a signal may be performed when the movable member is implemented to be a non-restoring type in which the movable member does not return to the initial position.

Referring to FIG. 35, when the electronic apparatus is turned on and activated, the touch panel may be driven at operation S3510. The electronic apparatus may receive a signal of the input device on an off section while periodically turning on or off the electrodes within the touch panel.

When the signal of the input device is sensed at operation S3520, the electronic apparatus may detect a frequency by processing the sensed signal at operation S3530. The method for detecting the frequency is specifically described above, which will not be further explained below for brevity.

When the frequency is detected, the electronic apparatus may perform the control operation corresponding to the detected frequency at operation S3540. Specifically, assume that the function displaying the writing trajectories according to the movement of the input device may be performed, the option to change the thickness of the writing trajectories may be matched regarding the manipulating of the user manipulator, the thickness of the writing trajectories corresponding to f1 may be 0.1 mm, and the thickness of the writing trajectories corresponding to f2 may be 0.3 mm. In this case, when the frequency of the received signal is gradually changed from f1 to f2, the electronic apparatus may display the writing trajectories to be thicker gradually from 0.1 mm to 0.3 mm. Further, assuming that the function changing the color of the writing trajectories may be matched regarding the input device, f1 may correspond to the red, and f2 may correspond to the green. In this case, the electronic apparatus may change the color of the writing trajectories in gradation or in stages according to the order from red, orange, yellow, and green when the frequency of the received signal is gradually changed from f1 to f2. Besides, other various options may be matched, which will not be further explained below.

Figure 36:
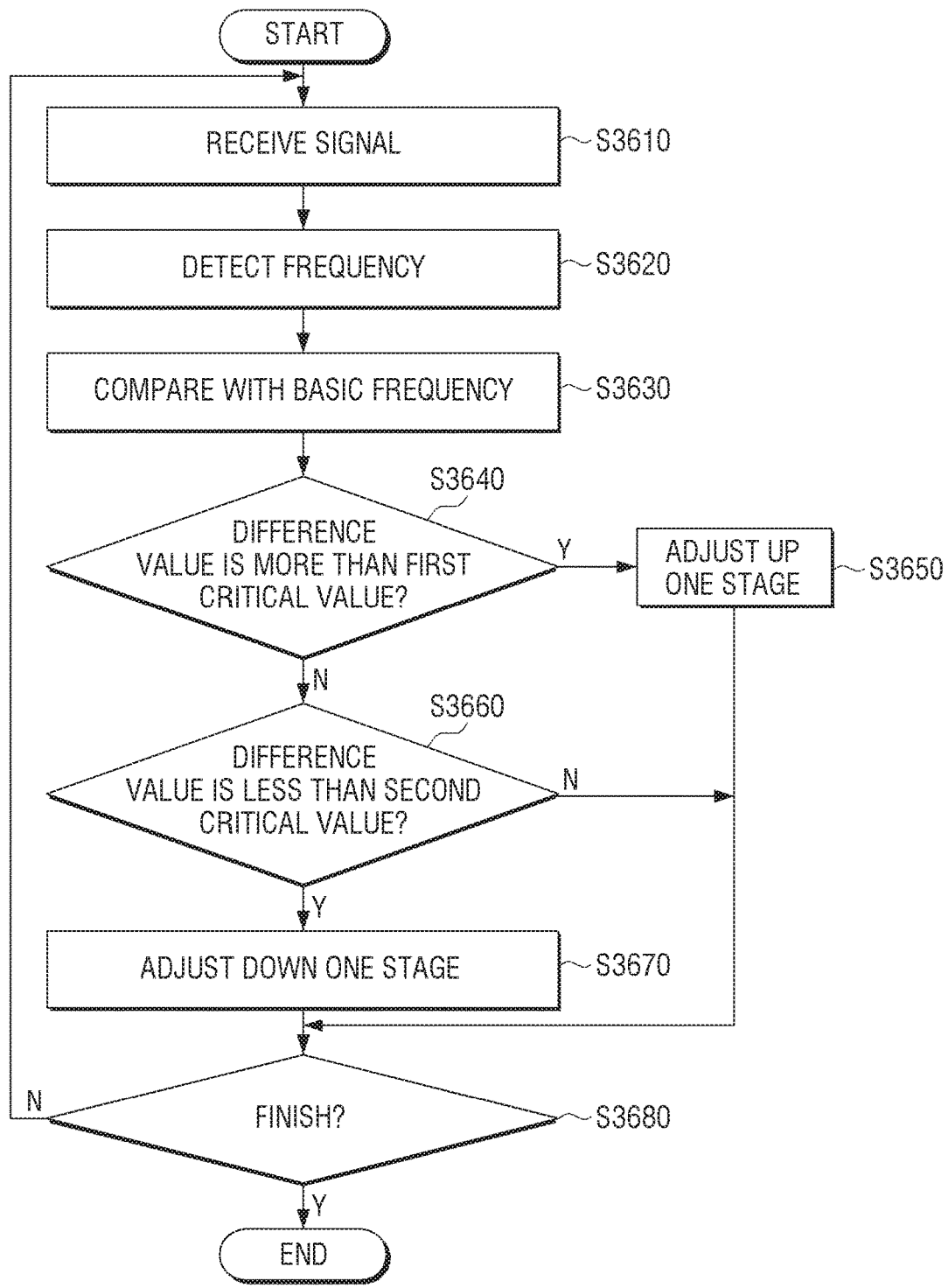

FIG. 36 is a flowchart explaining a method for processing a signal of the electronic apparatus according to another embodiment of the present disclosure. FIG. 36 illustrates the method for processing a signal when the input device includes the restoring type of the user manipulator. As described above, when the user manipulator is implemented as a restoring type, the movable member may return to the initial position after a user pushes or rotates the movable member from the initial position.

Referring to FIG. 36, when the signal of the input device is received at S3610, the frequency may be detected from the received signal at operation S3620.

When the frequency is detected, the electronic apparatus may compare the detected frequency with a pre-stored basic frequency at operation S3630. Thereby, the difference value between the frequency of the received signal and the basic frequency may be calculated, and the calculated difference value may be compared with a preset first critical value at operation S3640.

When the difference value exceeds the first critical value as a comparing result, the electronic apparatus may adjust up the options of the touch panel by one stage at S3650. The options may include the thickness, the brightness, the chroma, and the color of the writing trajectories. For example, when the brightness is set to be 5, the electronic apparatus may adjust into the next stage, i.e., 6. Further, the brightness, the contrast, the touch sensitivity, the resolution, the font size, the volume, and the channel tuning regarding the touch panel may be variously included in the options.

Further, regarding the embodiment of the operations such as changing of contents or web pages, scrolling of images, and adjusting of image sizes, the electronic apparatus may perform the operation to change into next content or next web page, scroll the image toward the lower, or expand the image.

Meanwhile, when the calculated difference value is less than the first critical value at operation S3640, the electronic apparatus compares the calculated difference value with a preset second critical value at operation S3660. When the calculated difference value is less than the second critical value, the electronic apparatus may adjust down the options of the touch panel by one stage at operation S3670. The above embodiment may adjust the brightness from 5 to 4. When the calculated difference value is more than the second critical value at operation S3660, the electronic device skips operation S3670 and stands by at operation S3680.

The electronic apparatus may continuously perform the above operation until the operation completes when the electrical power turns off or stands by at operation S3680.

When implemented as a restoring type of the slide button as illustrated in FIG. 15, the capacitance may be different between an example in which the movable member is moved in the B direction toward the first electrode 271 and another example in which the movable member is moved in the A direction toward the first electrode 272. Thus, when the thickness, the material quality, and the size of the pair of dielectric materials 251, 252 are differently set, the capacitance may increase when the movable member is moved toward one direction, and decrease when being moved toward another direction. Further, the range of the capacitance when being moved toward one direction may be different from the range of the capacitance toward another direction. The electronic apparatus may store the preset critical values by considering the above features. Further, because the restoring type of the slide button is used, when a user pushes the user manipulator toward the first direction, the capacitance may be changed, and returned to the initial value. The controller may adjust up or adjust down the capacitance by one stage whenever the above operation is sensed.

Figure 37:
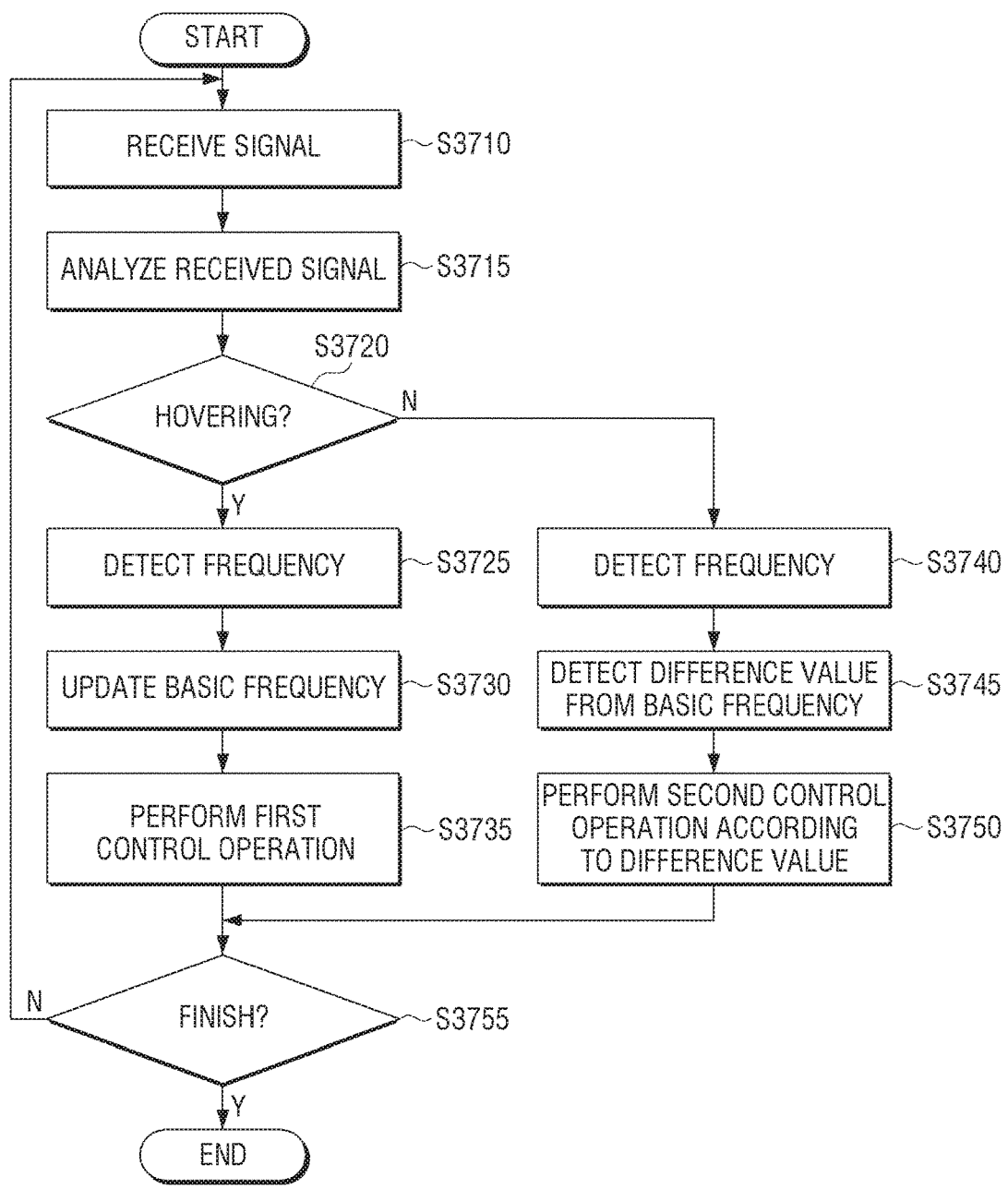

FIG. 37 is a flowchart explaining a method for processing a signal regarding the electronic apparatus according to another embodiment of the present disclosure. Specifically, FIG. 37 is a flowchart of the method for processing a signal regarding the electronic apparatus which uses the input device including both of the non-restoring type of the user manipulator and the pen pressure module.

Referring to FIG. 37, when the signal of the input device is received at operation S3710, the electronic apparatus may analyze the received signal at operation S3715. The electronic apparatus may determine whether the state is hovering or touching according to a size of the received signal at operation S3720.

As a determining result, when the state is hovering, the electronic apparatus may detect the frequency of the received signal at operation S3725. As described above, the pen pressure module may not operate unless the display screen is touched. Thus, when the frequency is changed at the hovering state, the changing may follow to the manipulating of the user manipulator.

The electronic apparatus may update the pre-stored basic frequency to the detected frequency and store it at operation S3730. Thereby, the first control operation matched with the user manipulator may be performed according to the basic frequency at operation S3735. When the first control operation is matched with the brightness adjust function, the electronic apparatus may adjust the brightness corresponding to the detected frequency.

Meanwhile, when the state is not hovering, the electronic apparatus may detect the frequency of the received signal and calculate the difference value with the basic frequency at operations S3740 and 3745, respectively. The electronic apparatus may perform the preset second control operation according to the calculated difference value at operation S3750. When the state is touching instead of hovering, the signal frequency of the input device may be changed with the pen pressure module. As described above, when the difference value between the basic frequency and the detected frequency is used, the second control operation may be performed only with the size of the pen pressure even if the basic frequency is updated. When the second control operation is matched with the function adjusting the depth of the writing trajectories, the electronic apparatus may adjust the depth of the size corresponding to the calculated difference value.

The electronic apparatus may continuously perform the above operation until the operation completes at operation S3755 when the electrical power turns off or stands by. When the method for processing a signal of FIG. 37 is used, the different control operations may be performed by determining whether the signal changing is performed by the pen pressure module or by the user manipulator.

Figure 38:
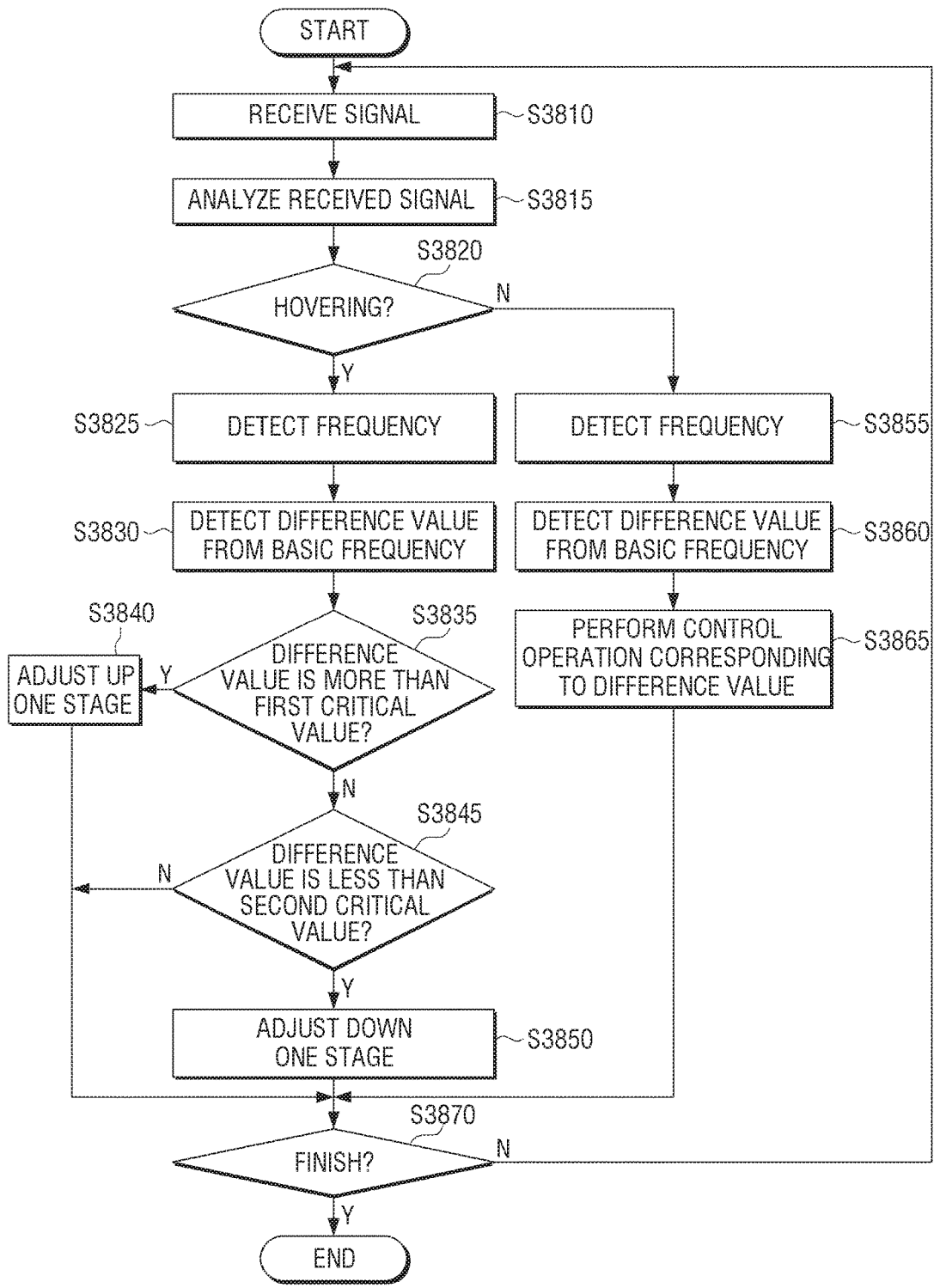

FIG. 38 is a flowchart explaining a method for processing a signal of the electronic apparatus according to another embodiment of the present disclosure. Specifically, FIG. 38 is a flowchart explaining the method for processing a signal of the electronic apparatus using the input device which includes both of the restoring type of the user manipulator and the pen pressure module.

Referring to FIG. 38, when the signal of the input device is received at S3810, the electronic apparatus may analyze the received signal at operation S3815. The electronic apparatus may determine whether the state is hovering or touching according to a size of the received signal at operation S3820.

When the state is determined to be hovering, the electronic apparatus may detect the frequency of the received signal at operation S3825. The electronic apparatus may calculate the difference value between the detected frequency and the basic frequency at operation S3830. Regarding the restoring type of the user manipulator, when the user manipulator is pushed toward the first direction and is at the hovering state, the capacitance may be changed and returned to the initial value. Thus, when the difference value with the basic frequency is changed to exceed the first critical value at operation S3835, the preset options may be adjusted up by one stage as described above at operation S3840. Meanwhile, when the difference value is less than the first critical value at operation S3835, and the different value is less than a second critical value at operation S3845, the preset options may be adjusted down by one stage at operation S3850.

When the input device is determined not to be hovering, the electronic apparatus may detect the frequency of the received signal and calculate the difference value with the basic frequency at operations S3855 and S3860, respectively. The electronic apparatus may perform the control operation corresponding to the calculated difference value at operation S3865. The electronic apparatus may continuously perform the above operation until the operation completes at operation S3870 when the electrical power turns off or stands by.

When the frequency is changed at the hovering state as described above, the changing may indicate that the performing follows the manipulating of the user manipulator. A user may perform the operation to control the first function by adjusting the pen pressure while putting the input device on the touch panel of the electronic apparatus and drawing. When the first function provides the thickness adjusting, a user may freely change the thickness of the writing trajectories by adjusting the pen pressure. When a user desires to control the second function, he may manipulate the user manipulator by moving the input device away from the touch panel. When the second function provides the brightness adjusting, the electronic apparatus may adjust up the brightness by one stage whenever the user manipulator is moved toward the first direction and returned back. Meanwhile, the electronic apparatus may adjust down the brightness by one stage whenever the user manipulator is moved toward the second direction and returned back. Thereby, a user may conveniently adjust a plurality of functions.

The various methods for processing a signal described above may be performed by the electronic apparatus. The electronic apparatus may be implemented as various types as described above.

Figure 39:
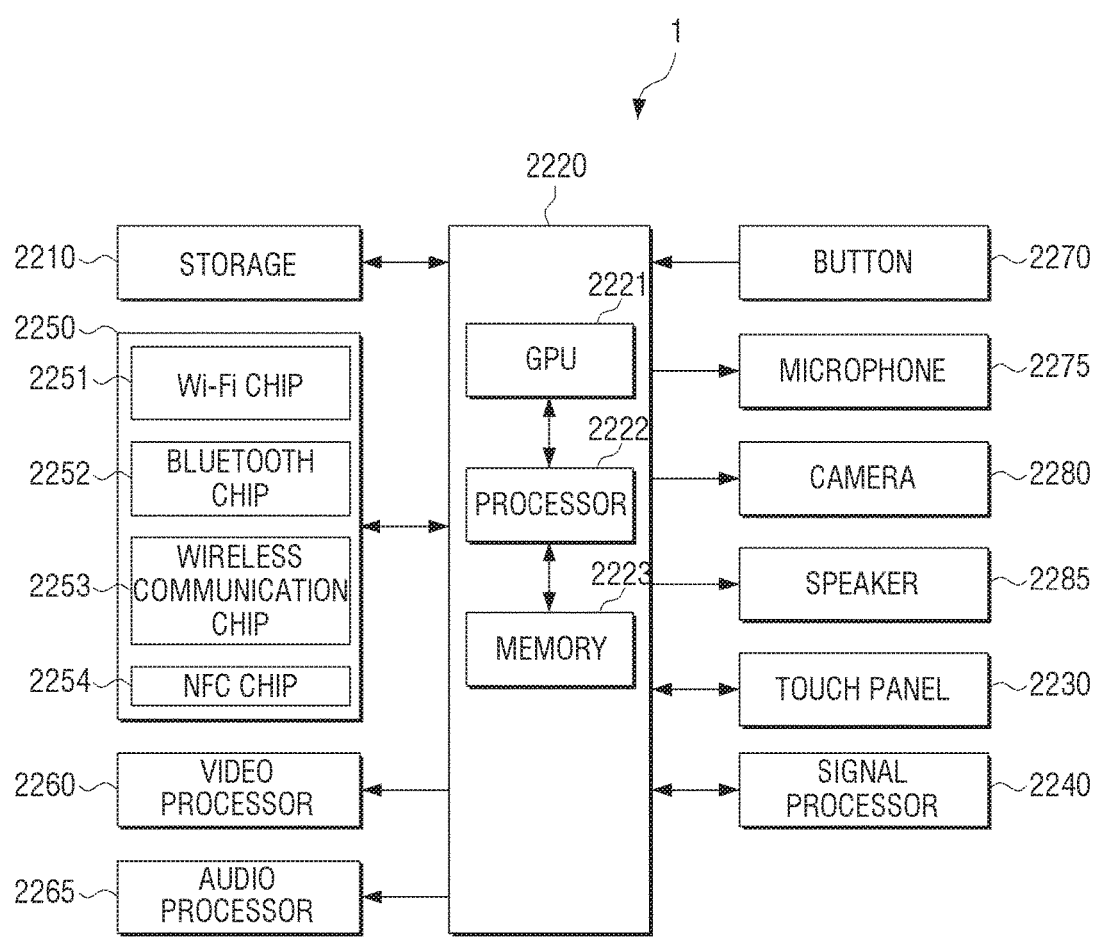
FIG. 39 is a block diagram exemplifying a detailed constitution of the electronic apparatus according to an embodiment of the present disclosure.

FIG. 39 is a block diagram illustrating the detailed constitution of the electronic apparatus implemented as a portable phone according to an embodiment of the present disclosure. Referring to FIG. 39, the electronic apparatus includes the storage 2210, the controller 2220, the touch panel 2230, the signal processor 2240, a communicator 2250, a video processor 2260, an audio processor 2265, a button 2270, a microphone 2275, a camera 2280, and a speaker 2285.

Referring to FIG. 39, the storage 2210, the controller 2220, the touch panel 2230 and the signal processor 2240 are uniform or similar to those of the above various embodiments of the present disclosure, which will not be further explained below for brevity.

The communicator 2250 may be a unit to perform the communication with various types of external devices according to various forms of the communication methods. The communicator 2250 includes a Wi-Fi chip 2251, a Bluetooth chip 2252, a wireless communication chip 2253, and a near field communication (NFC) chip 2254. The electronic apparatus may perform the communication with various types of the external devices and servers through the communicator 2250. Specifically, the electronic apparatus may download programs to perform the above various signal processing methods or download contents through the communicator 2250 and store the downloaded programs and contents in the storage 2210.

The video processor 2260 may be a unit to process the contents received through the communicator 2250 or the video data included in the contents stored in the storage 2210. The video processor 2260 may perform various image processing of the video data such as decoding, scaling, noise filtering, frame rate converting, and resolution converting. When the user manipulator of the input device is matched with the content changing function, the controller 2220 may control the video processor 2260 to reproduce another content according to the manipulating direction of the user manipulator.

The audio processor 2265 may be a unit to process the contents received through the communicator 2250 or the audio data included in the contents stored in the storage 2210. The audio processor 2265 may perform various processing of the audio data such as decoding, amplifying, and noise filtering. When the user manipulator of the input device is matched with the audio content changing function, the controller 2220 may control the audio processor 2265 to reproduce the different audio contents according to the manipulating direction of the user manipulator.

The button 2270 may be various types of buttons such as mechanical buttons, touch pad, and wheel which are formed on voluntary area of the front section, the side section, and the back section of the exterior main body of the electronic apparatus.

The microphone 2275 may be a unit to receive the user voice or other sounds and convert the same into audio data. The controller 2220 may use the user voice inputted through the microphone 2275 for a call process, or may convert the user voice into audio data and store it in the storage 2210.

The camera 2280 may be a unit to photograph still images or video according to the controlling of a user. The camera 2280 may include a plurality of cameras such as front camera and back camera. When the user manipulator of the input device is matched with the camera zoom function, the controller 2220 may perform zoom-in or zoom-out according to the manipulating direction of the user manipulator.

The speaker 2285 may output the audio data generated from the audio processor 2265. When the user manipulator of the input device is matched with the volume adjusting function, the controller 2220 may expand or reduce the volume according to the manipulating direction of the user manipulator.

Further, although not illustrated in FIG. 39, the electronic apparatus may include various external inputting ports to be connected with various external components such as a universal serial bus (USB) port that can be connected with a USB connector, a headset, a mouse, a local area network (LAN), a digital multimedia broadcasting (DMB) chip to receive and process a DMB signal, and a global positioning system (GPS) chip. When a DMB chip is included, a broadcasting channel tuning function may be matched with the user manipulator of the input device. Thereby, an upper channel number or a lower channel number may be selected according to the manipulating direction of the user manipulator.

The controller 2220 includes a graphic processing unit (GPU) 2221, a processor 2222, and a memory 2223.

The GPU 2221 may display various screens on the touch panel 2230 according to the controlling of the processor 2222 when the electronic apparatus is turned on. Specifically, the GPU 2221 may generate a screen including various objects such as icons, images, and texts by using a calculator (not illustrated) and a renderer (not illustrated). The calculator may calculate feature values such as coordinate values, shapes, sizes, and colors in which the objects will be respectively displayed according to the layout of the screen. The renderer may generate the screens in various layouts including the objects based on the feature values calculated in the calculator. For example, when the above described event occurs, the GPU 2221 may generate the various screens illustrated in FIGS. 30 to 35, and display on the touch panel 2230. Further, when the input device is dragged while being touched on the touch panel 2230, the GPU 2221 may display the writing trajectories according to the dragging.

The processor 2222 may access the storage 2210, and perform booting by using the stored operating system (OS) of the storage 2210. Further, the processor 2222 may perform various operations by using the various programs, contents, and data stored in the storage 2210.

The memory 2223 includes random access memory (RAM) and read only memory (ROM). ROM may store a command set for the system booting. When the electronic apparatus is turned on, the processor 2222 may copy the stored OS of the storage 2210 to RAM according to the stored command, and boot the system by implementing the OS. When the booting completes, the processor 2222 may copy the various programs stored in the storage 2210 to RAM, and perform various operations by implementing the programs copied in RAM. Specifically, the processor 2222 may perform the above described method for processing a signal.

Figure 40:
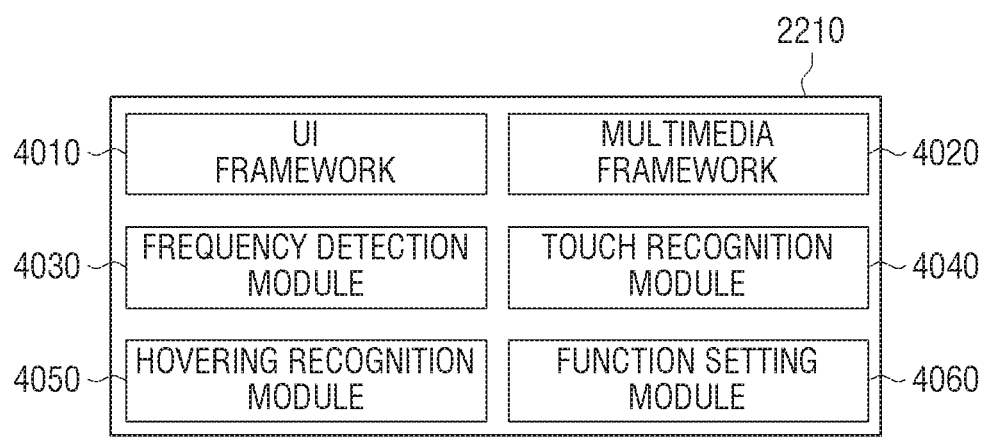
FIG. 40 is a diagram illustrating an example of software configuration of the electronic apparatus according to an embodiment of the present disclosure.

FIG. 40 is a diagram exemplifying structure of the software implemented in the electronic apparatus according to an embodiment of the present disclosure. Referring to FIG. 40, the storage 2210 may store various software as well as an OS or kernel. Specifically, a UI framework 4010, a multimedia framework 4020, a frequency detection module 4030, a touch recognition module 4040, a hovering recognition module 4050, and a function setting module 4060 may be stored in the storage 2210.

The UI framework 4010 is module to generate various UIs. UI framework 4010 may include image compositor module to create various objects within the screen, coordinate compositor module to calculate a coordinate in which an object will be displayed, rendering module to render the created object on the calculated coordinate, and two dimensional (2D)/(three dimensional) 3D UI toolkit to provide tools for generating a UI in 2D or 3D form.

The UI framework 4010 may draw various graphic lines, i.e., writing trajectories, according to the movement of the input device when the input device is touched on or drawn on the surface of the touch panel 2230. Further, the UI framework 4010 may generate various UIs as described above, and change and display a highlight within the UI according to the manipulating of the user manipulator.

The multimedia framework 4020 may be a module to reproduce the multimedia contents stored in the storage 2210 or provided from external sources. The multimedia framework 4020 may include a player module, a camcorder module, and a sound process module. Thereby, the multimedia framework 4020 may perform the operation to generate the various multimedia contents, generate screens and sounds, and reproduce. The multimedia framework 4020 may reproduce the previous content or the next content according to the manipulating of the user manipulator of the input device.

The frequency detection module 4030 may be a module to detect the frequency from the signal received from the input device, and calculate the difference value by comparing the detected frequency with the basic frequency.

The touch recognition module 4040 may be a module to recognize the point where the user hand or the input device is touched on the touch panel 2230. The touch recognition module 4040 may calculate the coordinate of the point of touch by analyzing the signal delivered from each electrode of the electrode 2310 within the touch panel 2230.

The hovering recognition module 4050 may be a module to recognize the point where the user hand or the input device is hovered on the touch panel 2230. The hovering recognition module 4050 and the touch recognition module 4040 may be implemented as one module or different modules.

The function setting module 4060 may be a module to set the functions controlled with the user manipulator and the pen pressure module of the input device. As described above, a user may set the functions with various methods. The function setting module 4060 may match the functions set by a user with the frequency and store in the storage 2210.

The software structure in FIG. 40 may be merely one of various embodiments of the present disclosure, and embodiments of the present disclosure are not limited thereto. Thus, some units may be excluded, changed, or added according to necessity. For example, the storage 2210 may be additionally provided with a sensing module to analyze the signals sensed at various sensors, a messaging module such as a messenger program (e.g., a short message service (SMS) program, a multimedia message service (MIMS) program, and an e-mail program), a call info aggregator program module, a voice over Internet protocol (VoIP) module, and a web browser module.

Further, the programs to perform the above described methods for processing a signal may be stored in various recording media as well as the storage 2210 and mounted on the electronic apparatus.

For example, a non-transitory computer readable recording medium may be provided storing a program performing the receiving the electromagnetic signal of the input device, the detecting the frequency by processing the inputted electromagnetic signal, calculating the difference value between the pre-stored basic frequency and the detected frequency, and performing the different control operations to each other according to the calculated difference value.

Non-transitory computer readable recording medium may indicate a medium which store data semi-permanently and can be read by devices, not a medium storing data temporarily such as register, cache, or memory. Specifically, the above various applications or programs may be stored and provided in a non-transitory computer readable recording medium such as a compact disc (CD), a digital versatile disc (DVD), a hard disk, a Blu-ray disk, a USB, a memory card, or a ROM.

Further, although the above is described with the passive type of the input device including the resonance circuit, various embodiments of the present disclosure are not limited thereto. The above various embodiments of the present disclosure may be implemented as an active type of the input device which operates by including a battery.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An input device, the input device comprising:
a case; and
a user manipulator disposed on the case;
wherein the user manipulator comprises:
a movable member configured to be movable on the case;
a plurality of first electrodes fixed within the case; and
a second electrode disposed on the movable member so as to be opposite to the plurality of first electrodes in which an opposed area of the second electrode opposing the plurality of first electrodes is varied according to the movement of the movable member, and
wherein a length of the second electrode is substantially equal to a length of each of the plurality of first electrodes and a distance between each of the plurality of first electrodes,
wherein the first and the second electrodes operate as capacitors, and
wherein the input device comprises a circuit configured to generate different signals according to a relative position between the first electrodes and the second electrode.

2. The input device of claim 1,
wherein the movable member is disposed to be exposed externally from an interior of a hole in a linear shape formed in the case, and slid along the hole when force is applied on the movable member, and
wherein the user manipulator further comprises an elastic member configured to return the movable member back to an initial position when the force applied on the movable member is removed while the movable member is moved within the hole.

3. The input device of claim 1, further comprising:
a conductive tip disposed on one end of the case; and
a pressure module configured to output different signals according to a pressure applied on the conductive tip.

4. The input device of claim 1, wherein the user manipulator further comprises a plurality of dielectric materials being formed respectively on the plurality of first electrodes and having different dielectric constants with respect to each other.

5. The input device of claim 3,
wherein the plurality of first electrodes are divided and disposed on the printed circuit board and do not contact the second electrode when the movable member is at an initial position, and sequentially contact the second electrode when a position of the movable member is moved,
wherein the user manipulator further comprises a plurality of capacitors respectively connected to the plurality of first electrodes, and
wherein the plurality of capacitors each have a capacitance greater than a maximum capacitance of the pressure module.

6. The input device of claim 1, wherein the user manipulator further comprises a dielectric material disposed between the plurality of first electrodes and the second electrode.

7. The input device of claim 1, wherein an initial position of the movable member is a position where an opposed area between the plurality of first electrodes and the second electrode is maximized.

8. The input device of claim 1, wherein an initial position of the plurality of first electrodes is a position where the opposed area of the second electrode becomes minimized or zero.

* * * * *